(12) United States Patent
Kim et al.

(10) Patent No.: US 8,866,992 B2
(45) Date of Patent: Oct. 21, 2014

(54) MOBILE TERMINAL

(75) Inventors: Jeongho Kim, Seoul (KR); Anna Yoo, Seoul (KR); Soowook Jang, Seoul (KR)

(73) Assignee: LG Electronics Inc., Seoul (KR)

(*) Notice: Subject to any disclaimer, the term of this patent is extended or adjusted under 35 U.S.C. 154(b) by 325 days.

(21) Appl. No.: 13/527,798

(22) Filed: Jun. 20, 2012

(65) Prior Publication Data

US 2013/0009180 A1   Jan. 10, 2013

(30) Foreign Application Priority Data

Jul. 5, 2011   (KR) .................. 10-2011-0066632

(51) Int. Cl.
*G02F 1/1335* (2006.01)
*F21V 8/00* (2006.01)

(52) U.S. Cl.
CPC ........ *G02F 1/133615* (2013.01); *G02B 6/0026* (2013.01); *G02F 2202/36* (2013.01); *G02F 2001/133614* (2013.01)
USPC .................. 349/61; 349/62; 349/65

(58) Field of Classification Search
CPC ............... G02F 1/133603; G02F 1/133614; G02F 1/133615; G02F 1/133609; G02F 2202/36; G02F 2001/133622; G02F 2001/1336; F21V 9/083
USPC ............................... 349/61, 62, 65
See application file for complete search history.

(56) References Cited

U.S. PATENT DOCUMENTS

| 8,504,113 | B2 * | 8/2013 | Kim et al. | 455/566 |
| 2009/0147497 | A1 * | 6/2009 | Nada | 362/84 |
| 2011/0304524 | A1 * | 12/2011 | Seen | 345/55 |
| 2012/0236587 | A1 * | 9/2012 | Kim et al. | 362/602 |
| 2012/0250351 | A1 * | 10/2012 | Shin et al. | 362/608 |

FOREIGN PATENT DOCUMENTS

| KR | 10-2009-0060149 A | 6/2009 |
| KR | 10-2011-0045302 A | 5/2011 |

* cited by examiner

*Primary Examiner* — Mike Qi
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display panel configured to display information; a plurality of light source parts spaced apart from each other and configured to output light; a light guide plate provided under the display panel and configured to guide the light output by the light source parts to the display panel; and a quantum dot filter part including a light entrance plane to which light is input and a light exit plane from which the light is wavelength-transformed and discharged. Further, at least one of the light entrance plane and the light exit plane of the quantum dot filter part includes a surface having a predetermined shape characteristic configured to increase an amount of the light input on and passed through the light entrance plane and to increase an amount of the light discharged from the light exit plane.

19 Claims, 22 Drawing Sheets

MOBILE TERMINAL

Pursuant to 35 U.S.C. §119(a), this application claims the benefit of earlier filing date and right of priority to Korean Application No. 10-2011-0066632, filed on Jul. 5, 2011, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for enhancing a color gamut (color reproduction) of a display using quantum dots and reducing a loss of radiation intensity due to a total reflection.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, the mobile terminals can be further classified into handheld terminals and vehicle mount terminals.

There are ongoing efforts to support and increase the functionality of mobile terminals. Such efforts include software and hardware improvements, as well as changes and improvements in the structural components which form the mobile terminal.

Recently, the advent of AMOLED (active matrix organic light emitting diode) in the display field of mobile terminals enables a color gamut (i.e., a rate indicating how much correctly a color is reproduced from a recorded image according to NTSC broadcast specifications) to be enhanced up to 100%. However, the AMOLED display has such a problem as a very high production cost, a short durability due to RGB made of organic material, and a low brightness.

SUMMARY OF THE INVENTION

Accordingly, the present invention is directed to a mobile terminal that substantially obviates one or more problems due to limitations and disadvantages of the related art.

An object of the present invention is to provide a mobile terminal, by which a color gamut of a display can be enhanced with a low production cost.

Another object of the present invention is to provide a mobile terminal, by which a color gamut of a display can be enhanced with a configuration of a related art LCD display.

Another object of the present invention is to provide a mobile terminal, by which a color variation of a display unit can be eliminated.

Another object of the present invention is to provide a mobile terminal, by which a radiation intensity loss of a light emitted from a light source part and/or a radiation intensity loss of a light emitted from a quantum dot filter part can be reduced.

A further object of the present invention is to provide a mobile terminal, by which a quantum dot included in a quantum dot filter part can be prevented from being degraded by the heat generated from a light source part.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display panel, a light guide plate provided under the display panel, a plurality of light source parts spaced apart from each other and providing lights incident upon the light guide plate and a quantum dot filter part having a light entrance plane to which a light emitted from the light source parts or the light guide plate is input and a light exit plane from which the light is discharged by being wavelength-transformed, wherein at least one of the light entrance plane and the light exit plane of the quantum dot filter part includes a total reflection preventing portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention is applicable to a various types of mobile terminals. Examples of such terminals include mobile phones, user equipments, smart phones, digital broadcast receivers, personal digital assistants, laptop computers, portable multimedia players (PMP), navigators and the like.

Figure 1:
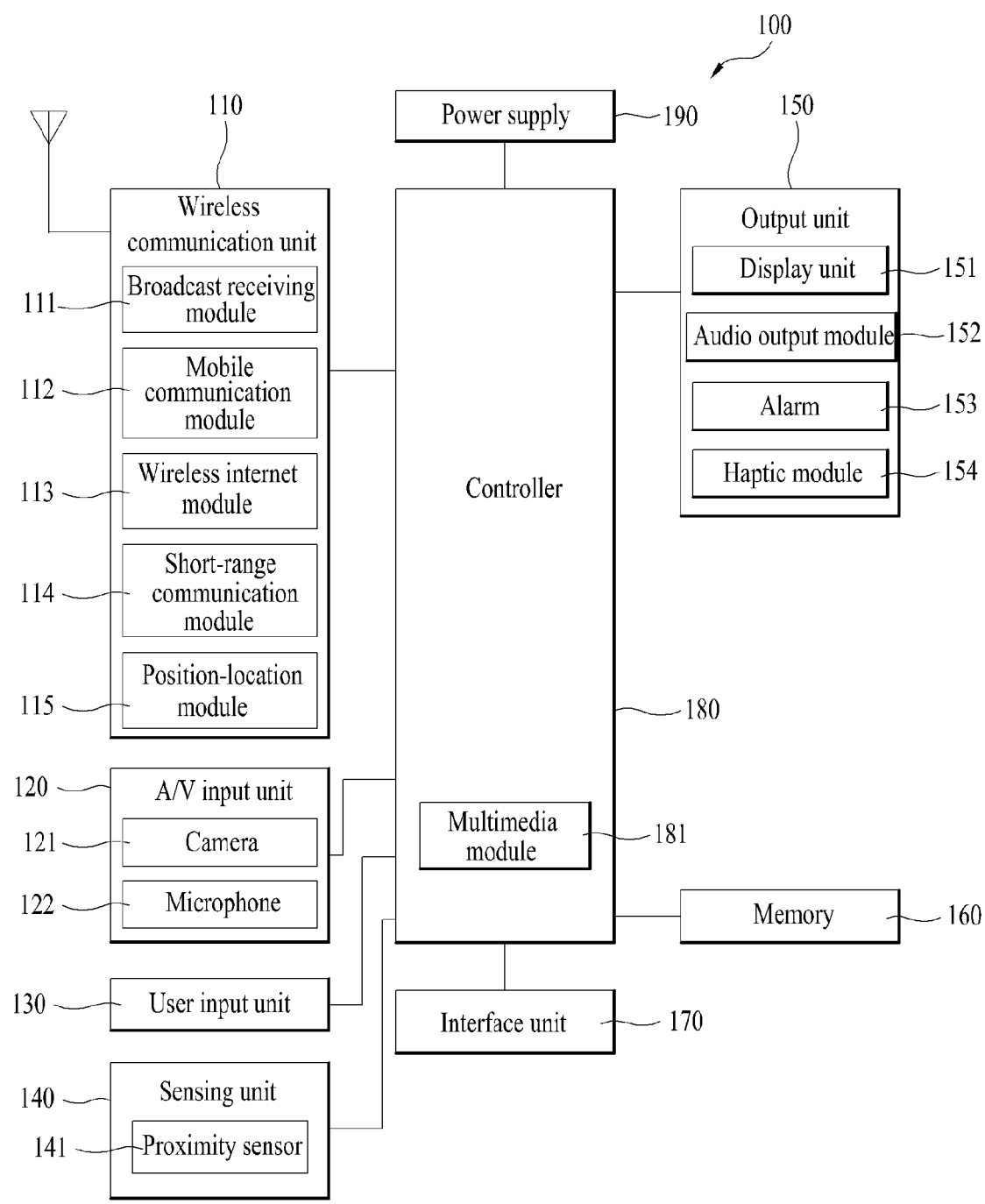
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. The broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it is able to use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 includes a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
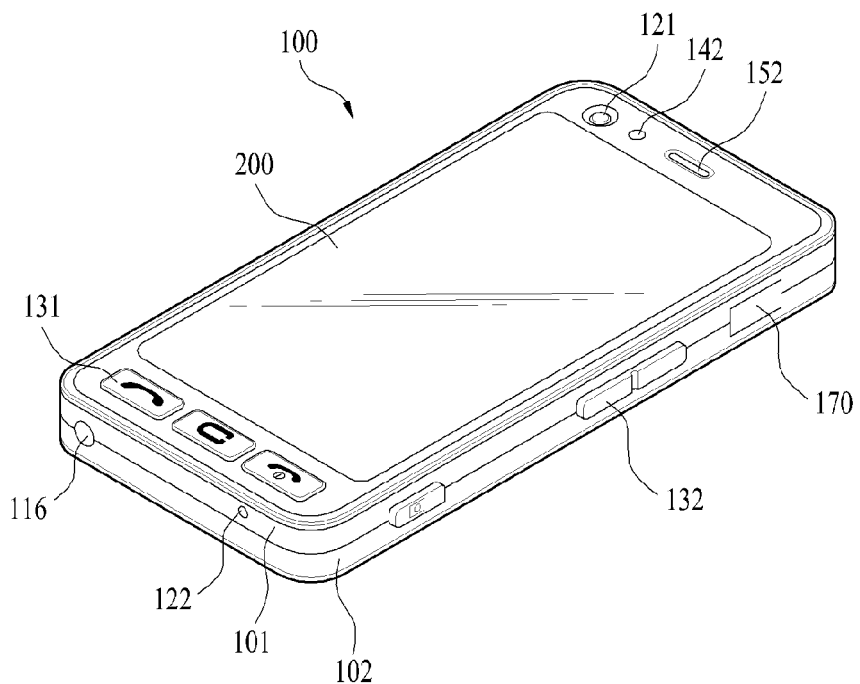
FIG. 2A is a front perspective diagram of a mobile terminal according to one embodiment of the present invention.

Next, FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

The display 151, audio output unit 152, camera 121, user input units 130/131 and 132, microphone 122, interface 170 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 2B:
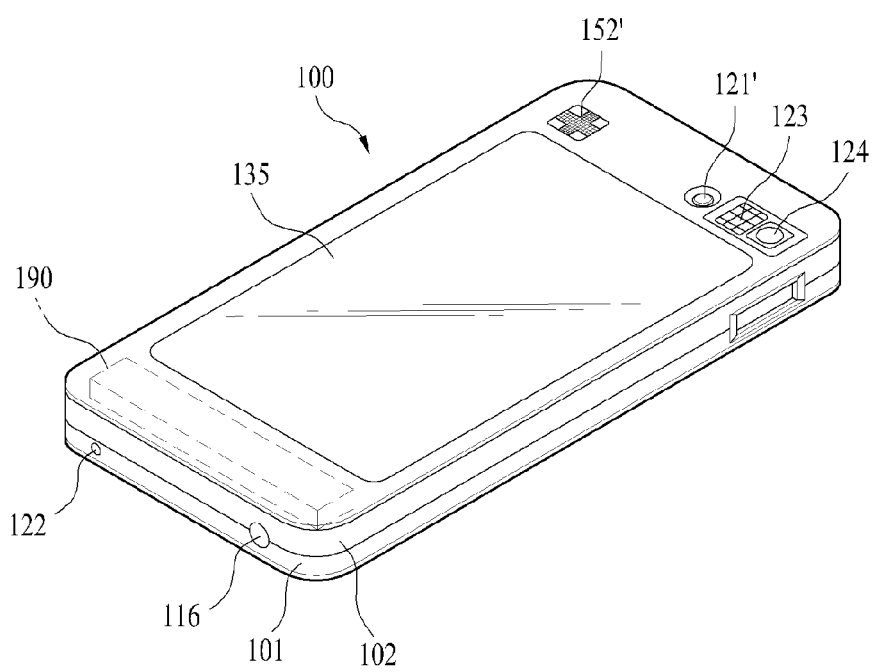
FIG. 2B is a rear perspective diagram of a mobile terminal according to one embodiment of the present invention

FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body. Another antenna 116 can also be included in the mobile terminal 100.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this instance, if the display 151 is configured to output visual information from its both faces, it is able to recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

For clarity and convenience, assume that a mobile terminal 100 mentioned in the following description may include at least one of the components shown in FIG. 1. In particular, a mobile terminal according to the present invention may include a display unit. The display unit includes a display panel and a backlight unit configured to providing light to the display panel. The backlight unit includes a plurality of light source parts arranged as being spaced apart from each other, a light guide plate provided under the display panel to receive incident light provided by the light source parts, and a quantum dot filter part charged with quantum dots, the quantum dot filter part having a light entrance plane to which a light emitted from the light guide plate is input and a light exit plane from which the light is discharged by being wavelength-transformed by the quantum dots. Further, at least one of the light entrance plane and the light exit plane of the quantum dot filter part may be provided with a total reflection preventing portion.

The total reflection preventing portion is a surface having a predetermined shape characteristic configured to increase an amount of the light input on and passed through the light entrance plane and to increase an amount of the light discharged from the light exit plane.

When the quantum dot filter part is arranged next to a light exit plane of the light source part or the light exit plane of the light guide plate, a portion of the light provided by the light source part or the light guide plate is totally reflected by the light entrance plane of the quantum dot filter part, propagates in a reverse direction toward the light source part or into the light guide part, and then enters the quantum dot filter part, whereby a radiation intensity of the light entering the quantum dot filter part may be possibly lost. Similarly, a portion of the light emitted externally from the quantum dot filter part by being wavelength-transformed by the quantum dot filter part is totally reflected by the light exit plane of the quantum dot filter part and then propagates in the reverse direction toward the quantum dot filter part, whereby a radiation intensity of the light output from the quantum dot filter part may be lost. In order to eliminate the radiation intensity losses at the light entrance plane and/or the light exit plane, the mobile terminal according to an embodiment of the present invention includes a total reflection preventing portion provided to the light entrance plane and/or the light exit plane of the quantum dot filter part.

In the following description, various embodiments of a quantum dot filter part are explained with a backlight unit included in a display unit as being classified into an edge-lit backlight unit or a direct-lit backlight unit.

Figure 3:
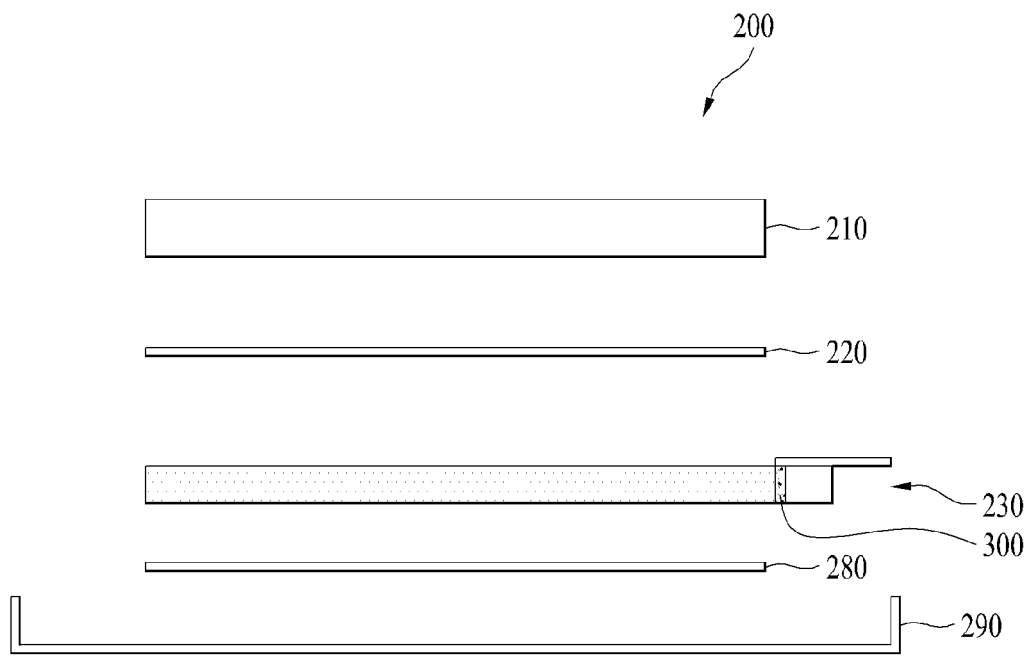
FIG. 3 is an exploded lateral-view diagram of a display unit according to a $1^{st}$ embodiment of the present invention.

Next, FIG. 3 is an exploded lateral-view diagram of a display unit 200 according to a $1^{st}$ embodiment of the present invention. Referring to FIG. 3, the display unit 200 includes a display panel 210, a diffuser sheet 220 arranged under the display panel 210, a backlight unit (BLU) 230 arranged under the diffuser sheet 220 to provide a light to the display panel 210, a reflector sheet 280 arranged under the backlight unit 230 to reflect the light provided by the backlight unit 230, and a frame 290 arranged under the reflector sheet 280 to support the aforementioned components of the display unit 200.

Figure 4:
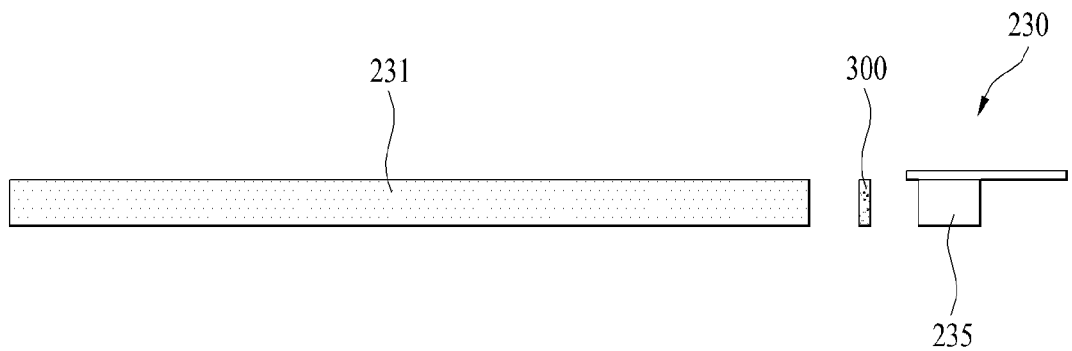
FIG. 4 is an exploded perspective diagram of a backlight unit included in a display unit according to a $1^{st}$ embodiment of the present invention.
Figure 5:
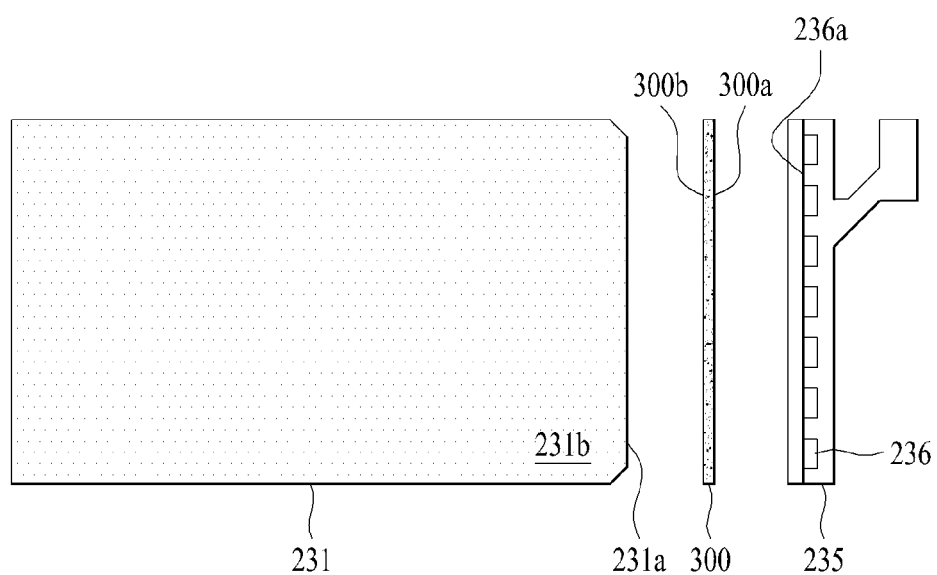
FIG. 5 is a schematic layout of a backlight unit included in a display unit according to a $1^{st}$ embodiment of the present invention.

FIG. 4 is an exploded perspective diagram of the backlight unit 230 included in the display unit 200 according to a $1^{st}$ embodiment of the present invention and FIG. 5 is a schematic layout of the backlight unit included in the display unit according to the $1^{st}$ embodiment of the present invention. Generally, a backlight unit of the display panel 210 is classified into a direct-lit type having a light source arranged on an entire backside of the display panel 210 and an edge-lit type having a light source arranged one an edge of the display panel 210. A backlight unit included in the display unit 200 according to an embodiment of the present invention relates to an edge-lit backlight unit widely used by a mobile terminal to reduce a thickness of the display unit 200.

Referring to FIG. 4 and FIG. 5, the backlight unit 230 includes a light guide plate 231 arranged under the display panel 210, a quantum dot filter part 300 arranged on an edge of a lateral side of the light guide plate 231 (also shown in FIG. 3), and a light source part supporting body 235 arranged on a lateral side of the quantum dot filter part 300 to support a plurality of light source parts 236. Preferably, the light guide plate 231, the quantum dot filter part 300 and the light source supporting body 235 are attached together using a light-transmittive resin.

Referring to FIG. 5, the light guide plate 231 includes a light entrance plane 231a configured to enable the light provided by the light source part 236 to enter and a light exit plane 231b configured to discharge the light to the display panel 210. In particular, the light entrance plane 231a and the light exit plane 231b are configured vertical to each other. Moreover, in order to maintain uniformity of a screen of the display panel 210, the light guide plate 231 enables uniform light to be emitted to the screen of the display panel 210 by decreasing a quantity of a scattering substance on a portion (i.e., a portion closer to the light entrance plane 231a) closer to the light source part 236 and increasing a quantity of the scattering substance on a portion farther from the light source part 236, thereby implementing a bright and clear image.

Figure 15:
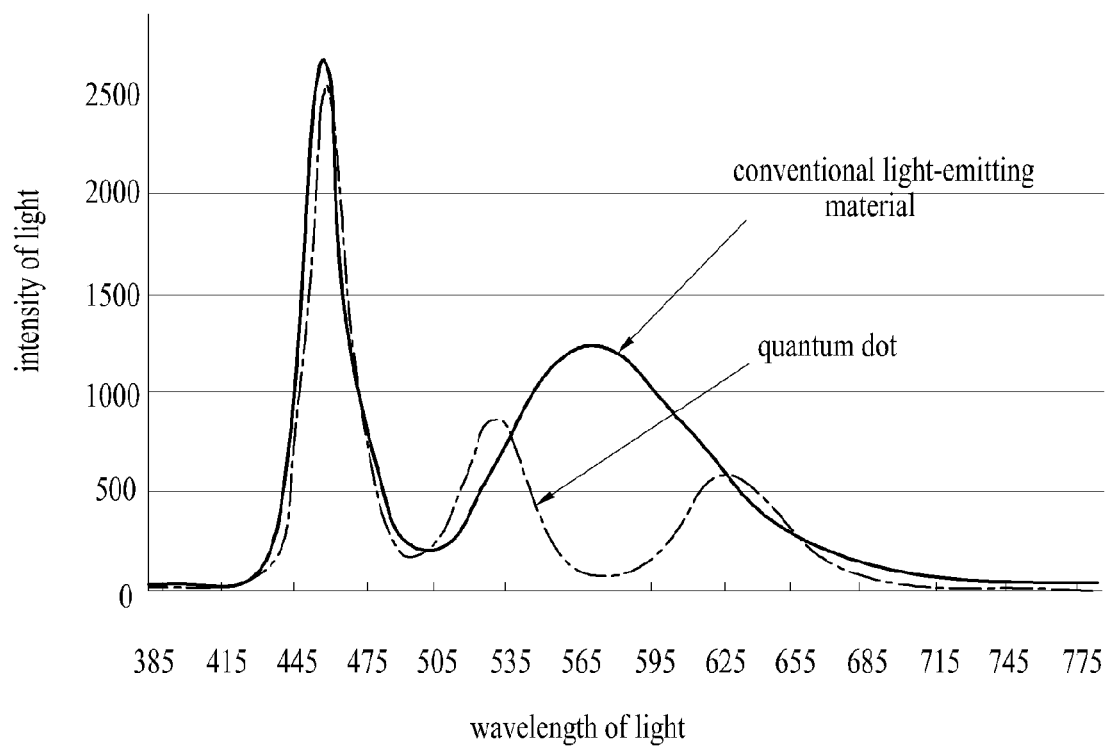
FIG. 15 is a graph of intensity of light per wavelength for a conventional light-emitting material and a quantum dot.

Referring to FIG. 5, the quantum dot filter unit 300 is a filter part charged with quantum dots and includes a light entrance plane 300a enabling the light provided by the light source part 236 to enter and a light exit plane 300b discharging the light to the light entrance plane 231a of the light guide plate 231. In this instance, regarding the properties of the quantum dots included in the quantum dot filter part 300, the quantum dot is a nano-sized semiconductor matter having a quantum confinement effect and has a property of generating a light stronger than that of a related art matter (e.g., phosphor) from a narrow wavelength (cf. graph shown in FIG. 15).

The light emission of the quantum dot is generated by an excited electron on a conduction band makes a transition to a valence band. Further, the light emission of the quantum dot has a characteristic such that a wavelength varies in accordance with a particle size despite the same matter. In particular, as a size of the quantum dot gets smaller, a light having a short wavelength (e.g., a blue light, etc.) is emitted. Hence, a light of a desired wavelength can be obtained by controlling a size of the quantum dot. Since the quantum dot emits a light despite that an excitation wavelength is randomly selected, when quantum dots of various types exists, various colors in the light can be observed even if the excitation is achieved with one wavelength. In addition, since the quantum dot makes a transition to a bottom vibration sate of the valence band from a bottom vibration state of the conduction band, it has such a property that an emission wavelength almost corresponds to a monochromatic light. Owing to the properties of the quantum dot, each color can be clearly represented on a display and the display can have brightness considerably higher than that of AMOLED.

Therefore, the present invention uses the quantum dot filter part 300 filled with quantum dots, thereby enhancing a color gamut over 100% as good as that of AMOLED with a product cost lower than that of the AMOLED. Moreover, the present invention can enhance brightness better than that of the AMOLED owning to the property of the quantum dot that emits a strong light on a narrow wavelength band.

One lateral side of the light source part supporting body 235 is connected to a lateral side of the quantum dot filter part 300 (i.e., a size situated toward the light entrance plane 300a of the quantum dot filter part 300), while the other lateral side of the light source part supporting body 235 is connected to the power supply unit 190. Referring to FIG. 4, the light source part supporting body 235 includes a plurality of the light sources parts 236 spaced apart from each other and each of the light source parts 236 includes a light exit plane 236 from which a light is discharged. Preferably, the light source part 236 includes an LED device. More preferably, the light source part 236 includes a blue LED or a UV LED.

A light emitting process of the backlight unit 230 is described as follows. First of all, the light generated from the light source part 236 of the LED device is discharged from the light exit plane 236a of the light source part 236, enters the light entrance plane 300a of the quantum dot filter part 300 to pass through the quantum dot filter part 300. While the light is passing through the quantum dot filter part 300, the light is transformed into strong R, G and B light on a narrow wavelength band. The R, G and B light are discharged from the light exit plane 300b of the quantum dot filter part 300 and are then provided to the light entrance plane 231a of the light guide plate 231.

Figure 6:
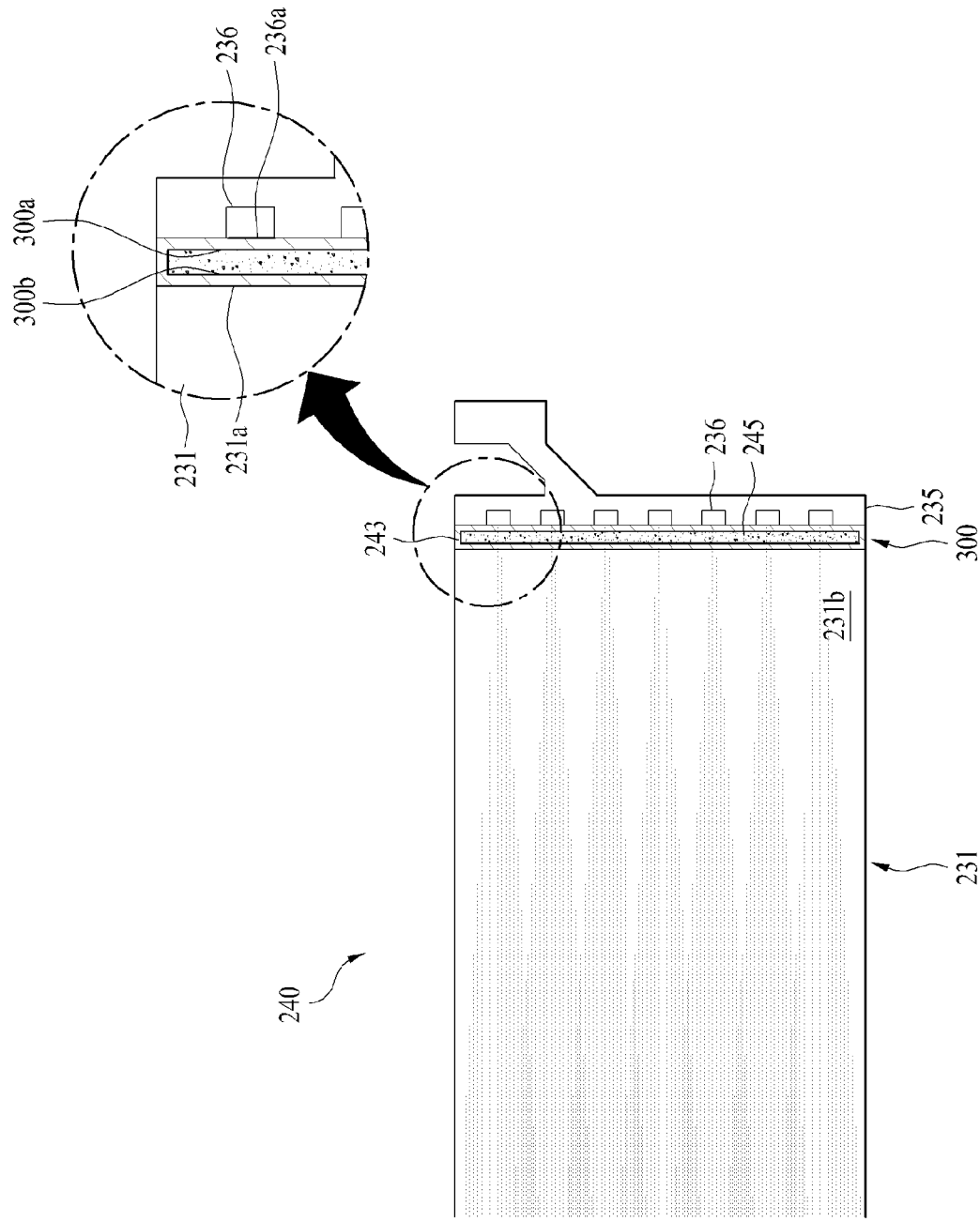
FIG. 6 is a schematic layout of a quantum dot filter part included in a display unit according to a $1^{st}$ embodiment of the present invention.

Next, FIG. 6 is a schematic layout of a quantum dot filter part included in a display unit 240 according to the 1$^{st}$ embodiment of the present invention. Referring to FIG. 6, the light generated from the light source part 236 propagates in order of the light exit plane 236a of the light source part 236, the light entrance plane 300a of the quantum dot filter part 300, the light exit plane 300b of the quantum dot filter part 300, the light entrance plane 231a of the light guide part 231 and the light exit plane 231b of the light guide part 231.

The quantum dot filter part 300 includes a light-transmittive pipe member 243 and quantum dots (QD) filling the light-transmittive pipe member 243. One side of the light-transmittive pipe member 243 forms a light entrance plane, while the other side of the light-transmittive pipe member 243 forms a light exit plane. Preferably, the light-transmittive pipe member 243 may be formed of glass. Thus, as the quantum dot filter part 300 is arranged next to a lateral side of the light source part 236, the quantum dot filter part 300 is added to the conventional edge-lit backlight unit without modifying the overall structure and configuration of the backlight unit like AMOLED. Therefore, the present invention enhances a color gamut over 100% like the AMOLED with a product cost lower than that of the AMOLED. Moreover, the quantum dot property of emitting a strong light on a short wavelength band enables brightness to be raised as well.

Yet, since the quantum dot filter part 300 is constructed with one hollow pipe member (QD), there is a region in which the light provided by the light source part 236 may be provided to the light entrance plane of the quantum dot filter part 300 at a big incident angle (i.e., an incident angle over a threshold angle that may cause a total reflection). Moreover, as the hollow pipe member 243 is configured long, scattering or reflection of the R and G lights excessively occurs within the quantum dot filter part 300, whereby scattering, reflection or total reflection of the light is facilitated within the quantum dot filter part 300. Hence, it may possibly occur that a color variation is generated from a screen of the display unit 200 between a region (e.g., the region corresponding to a right part of the light guide plate 231) adjacent to the light emitting module 240 and a region (e.g., the region corresponding to a left part of the light guide plate 231) distant from the light emitting module 240. Thus, although the quantum dot filter part 300 of the present invention is able to enhance a color gamut considerably better than that of the conventional LED backlight unit, the structure and shape of the quantum dot filter part 300 of the present invention may lower the overall color gamut of the display unit 200 more or less.

In the following description, explained in detail is a total reflection preventing portion provided to each of a light entrance plane and a light exit plane of a quantum dot filter part to prevent a light intensity loss of the light entrance plane and a light intensity loss of the light exit plane by eliminating the aforementioned color variation effect of the display unit.

Figure 7A:
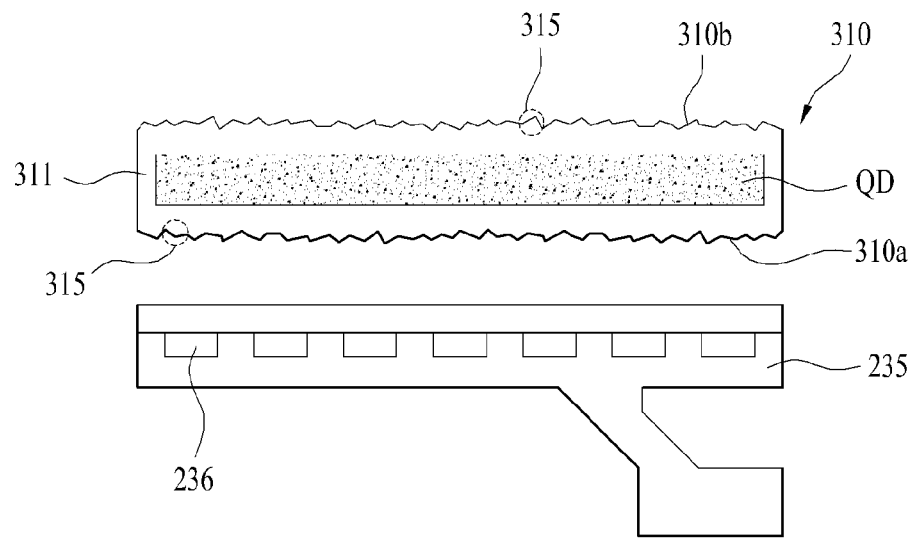
FIG. 7A is a schematic layout of a quantum dot filter part according to a $1^{st}$ embodiment of the present invention.
Figure 7B:
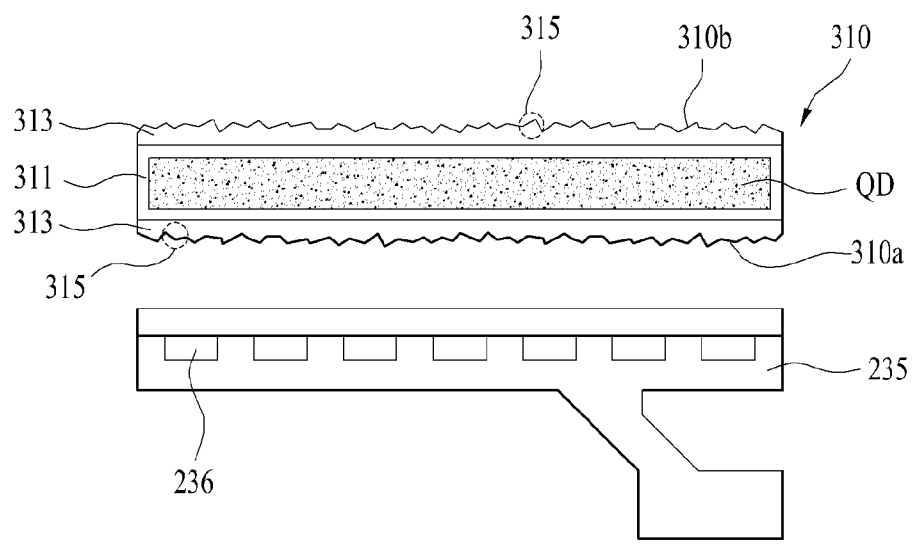
FIG. 7B is a schematic layout of a quantum dot filter part according to an additional embodiment of the present invention shown in FIG. 7A.
Figure 7C:
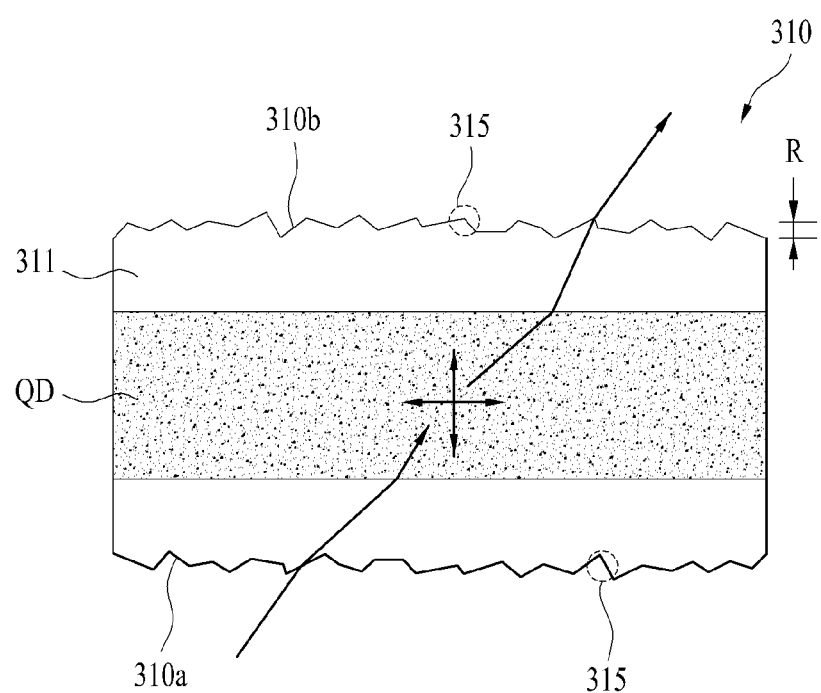
FIG. 7C is a schematic diagram for a total reflection preventing mechanism of a quantum dot filter part according to a 1st embodiment of the present invention.

FIG. 7A is a schematic layout of a quantum dot filter part 310 according to the 1$^{st}$ embodiment of the present invention. FIG. 7B is a schematic layout of the quantum dot filter part 310 according to an additional embodiment of the present invention shown in FIG. 7A. Further, FIG. 7C is a schematic diagram for a total reflection preventing mechanism of the quantum dot filter part 310 according to the 1$^{st}$ embodiment of the present invention.

Referring to FIG. 7A, the quantum dot filter part 310 includes a total reflection preventing portion 315 built in one body of a light entrance plane 310a and/or a light exit plane 310b to prevent a total reflection of light. Further, the total reflection preventing portion 315 has a surface roughness (R) within a range of preventing light from being totally reflected by the light entrance plane 310a or the light exit plane 310b.

In particular, if the total reflection preventing portion 315 is formed in one body of the light entrance plane 310a, the total reflection preventing portion 315 has a surface roughness (R) preset within a range of preventing light provided by the light source part 236 from being totally reflected by the light entrance plane 310a of the quantum dot filter part 310. If the total reflection preventing portion 315 is formed in one body of the light exit plane 310b, the total reflection preventing portion 315 has a surface roughness (R) within a range of preventing a light wavelength-transformed by a quantum dot (QD) filling the quantum dot filter part 310 from being totally reflected by the light exit plane 310b of the quantum dot filter part 310. Preferably, the preset surface roughness (R) is an RMS (root mean square) value ranging 1 μm to 100 μm.

Referring to FIG. 7B, the quantum dot filter part 310 according to an embodiment additional to the 1$^{st}$ embodiment of the present invention may further include an insulating film 313 provided to at least one of the light entrance plane 310a and the light exit plane 310b. Further, the total reflection preventing portion 315 configured to prevent total reflection of light is provided to the insulating film 313. In this instance, the total reflection preventing portion 315 has a surface roughness (R) within a range of preventing a light from being totally reflected by the light entrance plane 310a or the light exit plane 310b.

When the insulating film 313 is provided to either the light entrance plane 310a or the light exit plane 310b of the quantum dot filter part 310, the total reflection preventing portion 315 having a surface roughness (R) within a range of preventing a light from being totally reflected, as shown in FIG. 7A, may be provided to the plane failing to be provided with the insulating film 313 by being formed in one body of the quantum dot filter part 310. Moreover, when the insulating film 313 is provided to either the light entrance plane 310a or the light exit plane 310b of the quantum dot filter part 310, it is preferable that the insulating film 313 is provided to the light entrance plane 310a to which heat generated from the light source part 236 is transferred.

Preferably, the insulating film 313 is formed of polystyrene having a good light-transmittive property and a good thermal insulation property. Regarding physical properties of polystyrene, the polystyrene has a refractive index of about 1.55 that is similar to that of a light-transmittive pipe member 311 of the quantum dot filter part 310 made of glass. Even if the insulating film 313 is provided to a surface of the quantum dot filter part 310, it has almost no influence on a propagating direction of light and has good thermal stability to efficiently cut off heat generated from the light source part 236. Moreover, the polystyrene has good molding property and is strong against mechanical defect such as scratch and the like. Thus, if the insulating film 313 is provided to the light entrance plane 310a and/or the light exit plane 310b of the quantum dot filter part 310, the durability of the quantum dots (QD) filling the quantum dot filter part 310 can be prevented from being shortened due to the heat generated from the light source part 236.

When the total reflection preventing portion 315 is provided to the insulating film 313 provided to the light entrance plane 310a, the total reflection preventing portion 315 may have a surface roughness (R) preset within a range of preventing light provided by the light source part 236 from being totally reflected by the light entrance plane 310a of the quantum dot filter part 310. When the total reflection preventing portion 315 is provided to the insulating film 313 provided to the light exit plane 310b, the total reflection preventing portion 315 may have a surface roughness (R) within a range of preventing the light wavelength-transformed by the quantum dot (QD) filling the quantum dot filter part 310 from being totally reflected by the light exit plane 310b of the quantum dot filter part 310.

Preferably, the preset surface roughness (R) is an RMS (root mean square) value ranging 1 μm to 100 μm. Preferably, the preset surface roughness (R) may be formed by grinding.

When light arrives at the light entrance plane 310a and/or the light exit plane 310b at an angle over a total reflection threshold angle, the light is totally reflected in part by a flat plane having a very small surface roughness (R) to cause a light intensity loss. Yet, referring to FIG. 7C, when light arrives at the light entrance plane 310a and/or the light exit plane 310b at an angle over a total reflection threshold angle, the light enters a surface, which is rough according to the present surface roughness (R) of the present invention, at an incident angle smaller than the total reflection threshold angle due to the preset surface roughness (R). The incident light is refracted by the light entrance plane 310a and/or the light exit plane 310b to transmit the light entrance plane 310a and/or the light exit plane 310b, whereby the light intensity loss can be reduced.

Moreover, the total reflection preventing portion 315 having the preset surface roughness (R) of the present invention enables the strong straightforward light provided by the light source part 236 to pass through the quantum dot filter part 310 by being scattered and dispersed by the total reflection preventing portion 315. Hence, as the quantum dots (QD) are efficiently excited, a color gamut can be enhanced. Moreover, as the straightforwardness of the light is alleviated, it is possible to considerably reduce a color variation effect at the light exit plane 310b of the display panel.

Figure 8A:
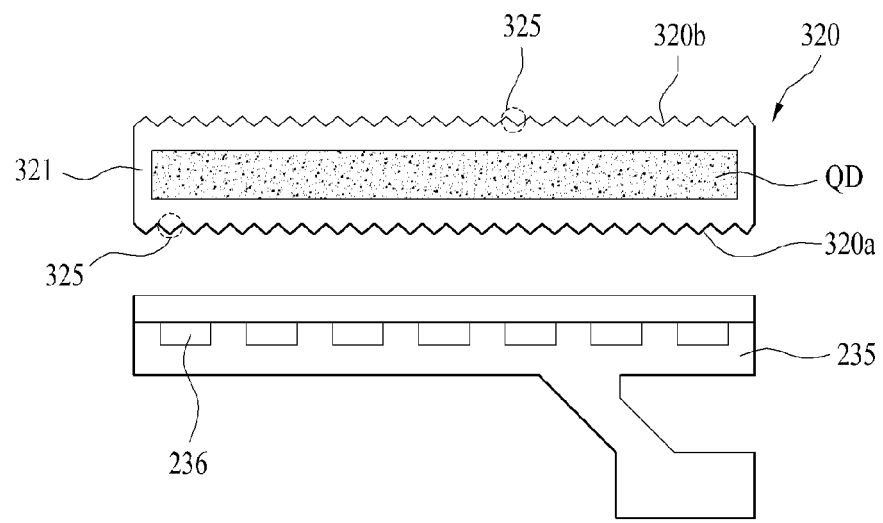
FIG. 8A is a schematic layout of a quantum dot filter part according to a 2nd embodiment of the present invention.
Figure 8B:
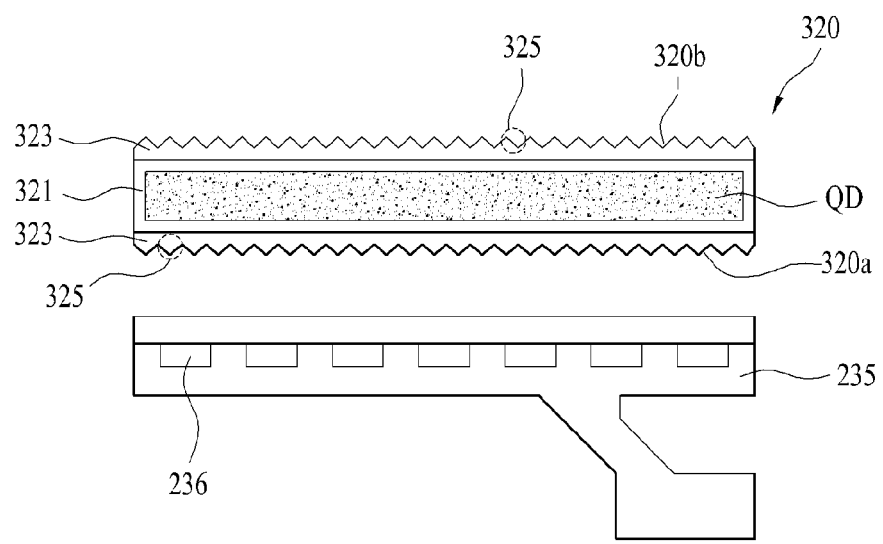
FIG. 8B is a schematic layout of a quantum dot filter part according to an additional embodiment of the present invention shown in FIG. 8A.
Figure 8C:
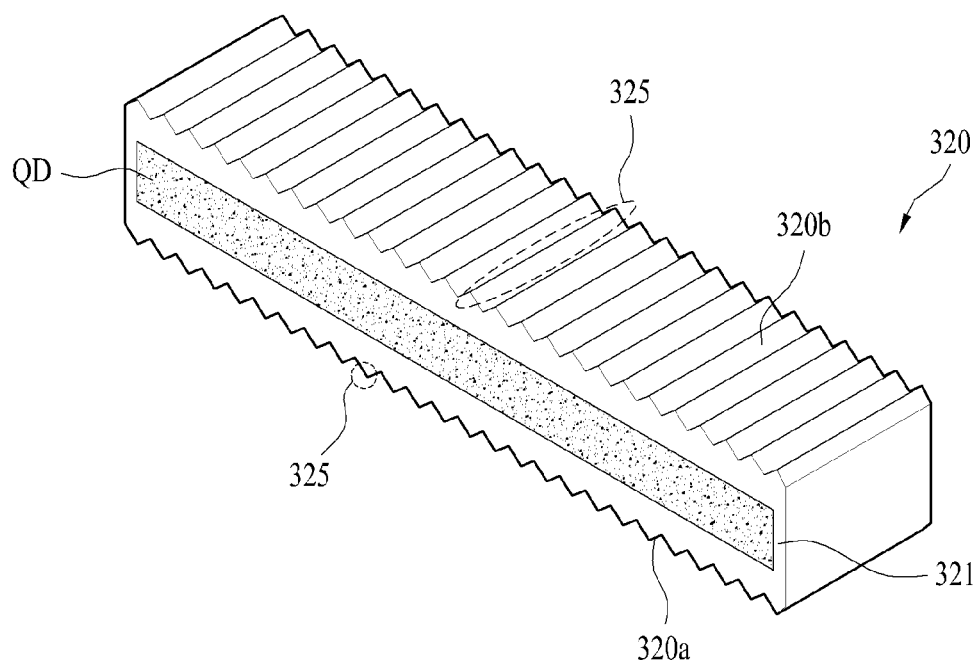
FIG. 8C is a schematic perspective diagram of a quantum dot filter part according to a 2nd embodiment of the present invention.
Figure 8D:
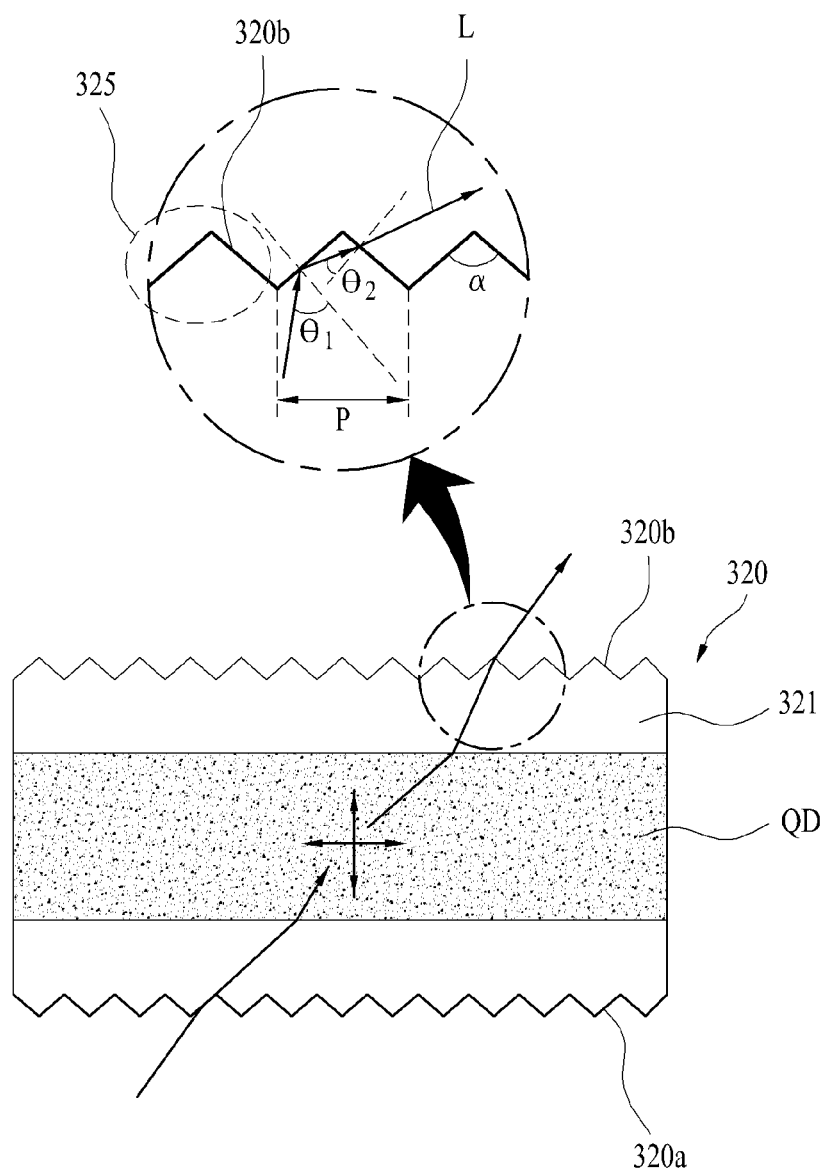
FIG. 8D is a schematic diagram for a total reflection preventing mechanism of a quantum dot filter part according to a 2nd embodiment of the present invention.

Next, FIG. 8A is a schematic layout of a quantum dot filter part 320 according to a $2^{nd}$ embodiment of the present invention. FIG. 8B is a schematic layout of a quantum dot filter part 320 according to an additional embodiment of the present invention shown in FIG. 8A. FIG. 8C is a schematic perspective diagram of the quantum dot filter part 320 according to the $2^{nd}$ embodiment of the present invention. Further, FIG. 8D is a schematic diagram for a total reflection preventing mechanism of the quantum dot filter part 320 according to the $2^{nd}$ embodiment of the present invention.

Referring to FIG. 8A, the quantum dot filter part 320 includes a total reflection preventing portion 325 built in one body of a light entrance plane 320a and/or a light exit plane 320b to prevent a total reflection of light. Further, the total reflection preventing portion 325 includes a plurality of prism shape patterns of which at least one of a horizontal cross-section and a vertical cross-section has a prism shape. In this instance, the prism shape is a triangle, as shown in FIG. 8A, and the prism shape pattern includes a unit pattern that is repeated with a predetermined gap (i.e., pitch).

The unit pattern of the prism shape pattern, as shown in FIG. 8C, may have a trigonal prism shape. Alternatively, the unit pattern of the prism shape pattern may have a trigonal pyramid shape.

Preferably, the pitch of the prism shape pattern may range 10 μm to 100 μm. Preferably, a prism angle of the prism shape pattern may range 70 degrees to 110 degrees. In this instance, the prism angle is the angle between a pair of light entrance planes 320a or a pair of light exit planes 320b. The aforementioned ranges of numerical values are based on experimental data.

Referring to FIG. 8B, the quantum dot filter part 320 according to an embodiment additional to the $2^{nd}$ embodiment of the present invention may further include an insulating film 323 provided to at least one of the light entrance plane 320a and the light exit plane 320b. Further, the total reflection preventing portion 325 configured to prevent total reflection of light is provided to the insulating film 323. In this instance, the total reflection preventing portion 325 includes a plurality of prism shape patterns of which at least one of a horizontal cross-section and a vertical cross-section has a prism shape. In this instance, the prism shape is a triangle, as shown in FIG. 8C, and the prism shape pattern includes a unit pattern that is repeated with a predetermined gap (i.e., pitch).

When the insulating film 323 is provided to either the light entrance plane 320a or the light exit plane 320b of the quantum dot filter part 320, the total reflection preventing portion 325 having a prism shape pattern of preventing a light from being totally reflected, as shown in FIG. 8A, may be provided to the plane failing to be provided with the insulating film by being formed in one body of the quantum dot filter part 320. Moreover, when the insulating film 323 is provided to either the light entrance plane 320a or the light exit plane 320b of the quantum dot filter part 320, it is preferable that the insulating film 323 is provided to the light entrance plane 320a to which heat generated from the light source part 236 is transferred.

Preferably, the insulating film 323 is formed of polystyrene having a good light-transmittive property and a good thermal insulation property. Regarding physical properties of polystyrene, the polystyrene has a refractive index of about 1.55 that is similar to that of a light-transmittive pipe member 321 of the quantum dot filter part 320 made of glass. Even if the insulating film 323 is provided to a surface of the quantum dot filter part 320, it has almost no influence on a propagating direction of light and has good thermal stability to efficiently cut off heat generated from the light source part 236. Moreover, the polystyrene has good molding property and is strong against mechanical defect such as scratch and the like. Thus, if the insulating film 323 is provided to the light entrance plane 320a and/or the light exit plane 320b of the quantum dot filter part 320, the durability of the quantum dots (QD) filling the quantum dot filter part 320 can be prevented from being shortened due to the heat generated from the light source part 236.

The unit pattern of the prism shape pattern, as shown in FIG. 8C, may have a trigonal prism shape. Alternatively, the unit pattern of the prism shape pattern may have a trigonal pyramid shape. Preferably, the pitch (p) of the prism shape pattern may range 10 μm to 100 μm. Preferably, a prism angle (α) of the prism shape pattern may range 70 degrees to 110 degrees. In this instance, the prism angle (α) is the angle between a pair of the light entrance planes 320a or a pair of the light exit planes 320b. The aforementioned ranges of numerical values are based on experimental data.

Preferably, the prism shape pattern may be formed by grinding. In particular, the prism shape pattern may be formed by performing a grinding process in a manner that one-directional pattern is formed on the light entrance plane 320a and/or the light exit plane 320b or the insulating film 323. Alternatively, the prism shape pattern may be formed by performing a one-directional grinding process in a manner that two-directional pattern is formed on the light entrance plane 320a and/or the light exit plane 320b or the insulating film 323 and then performing a grinding process in the other direction vertical to the one direction. In this instance, the one direction and the other direction may form an acute angle or an obtuse angle instead of a right angle. Alternatively, the prism shape pattern may be formed by a grinding process in at least three directions.

When light arrives at the light entrance plane 320a and/or the light exit plane 320b at an angle over a total reflection threshold angle, the light is totally reflected in part by a flat plane, on which any pattern is not formed, to cause a light intensity loss. Yet, referring to FIG. 8D, when light arrives at the light entrance plane 320a and/or the light exit plane 320b at an angle over a total reflection threshold angle, although the light arrives at a 1$^{st}$ light entrance plane 320a' and/or a 1$^{st}$ light exit plane 320b' at an incident angle θ1 over the total reflection threshold angle in the light entrance plane 320a and/or the light exit plane 320b including a plurality of the prism pattern shapes of the present invention and is then totally reflected, the light enters a 2$^{nd}$ light entrance plane 320a" and/or a 2$^{nd}$ light exit plane 320b" at an incident angle θ2 smaller than the total reflection threshold angle and then passes through the light entrance plane 320a and/or the light exit plane 320b by being refracted by the light entrance plane 320a and/or the light exit plane 320b. Therefore, the light intensity loss can be reduced. Moreover, the total reflection preventing portion 325 including a plurality of the prism shape patterns of the present invention enables the strong straightforward light provided by the light source part 236 to pass through the quantum dot filter part 320 by being scattered and dispersed by the total reflection preventing portion 325. Hence, as the quantum dots (QD) are efficiently excited, a color gamut can be enhanced. Moreover, as the straightforwardness of the light is alleviated, it may be able to considerably reduce a color variation effect at the light exit plane 320b of the display panel.

Figure 9A:
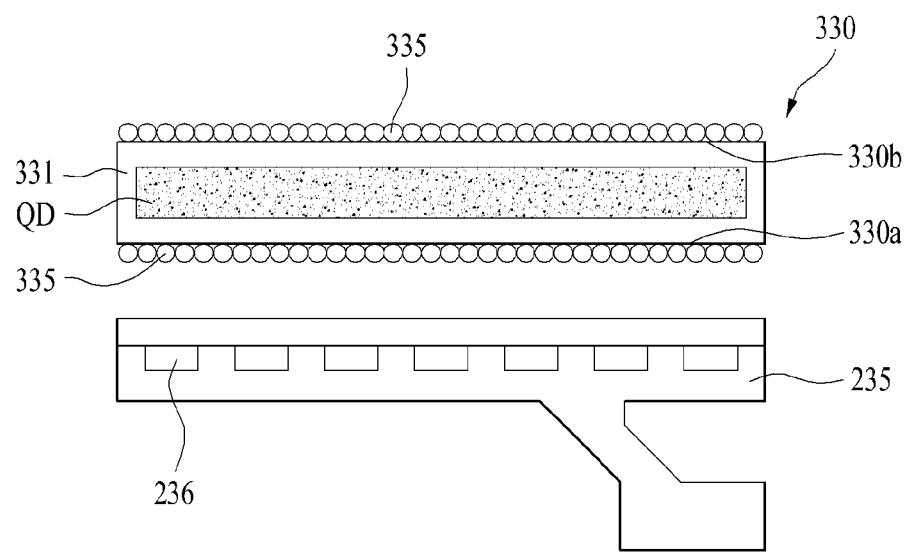
FIG. 9A is a schematic layout of a quantum dot filter part according to a 3rd embodiment of the present invention.
Figure 9B:
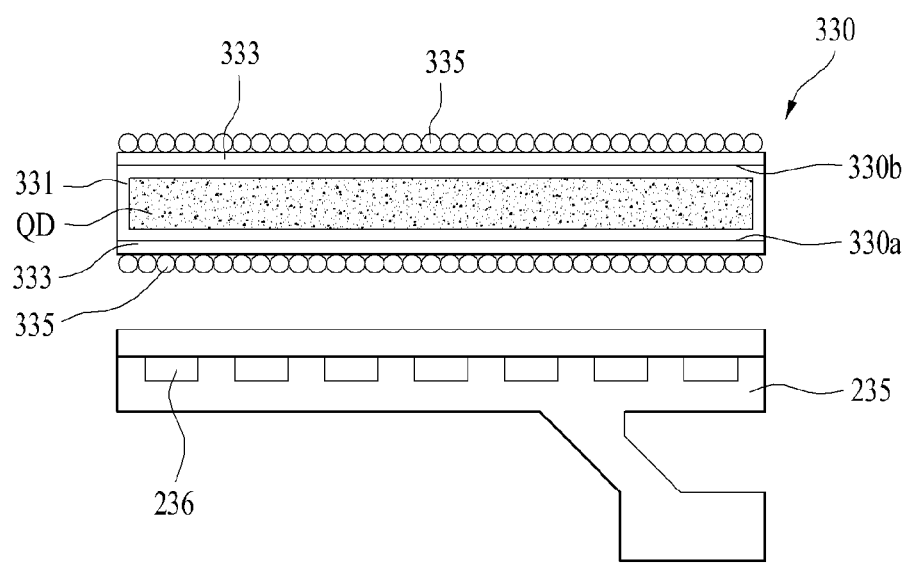
FIG. 9B is a schematic layout of a quantum dot filter part according to an additional embodiment of the present invention shown in FIG. 9A.
Figure 9C:
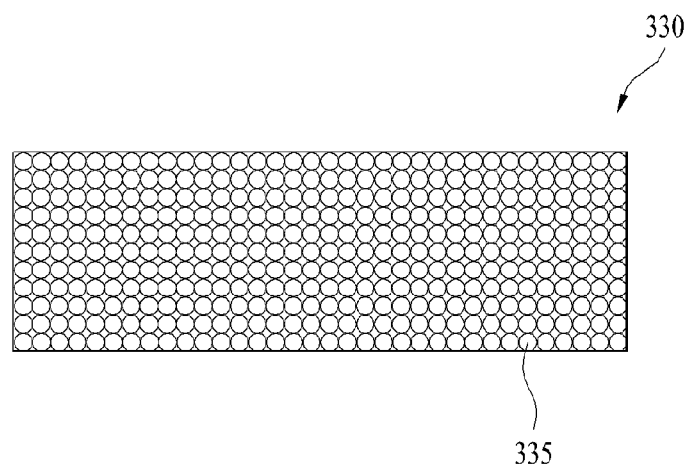
FIG. 9C is a schematic perspective diagram of the quantum dot filter part shown in FIG. 9A and FIG. 9B.
Figure 9D:
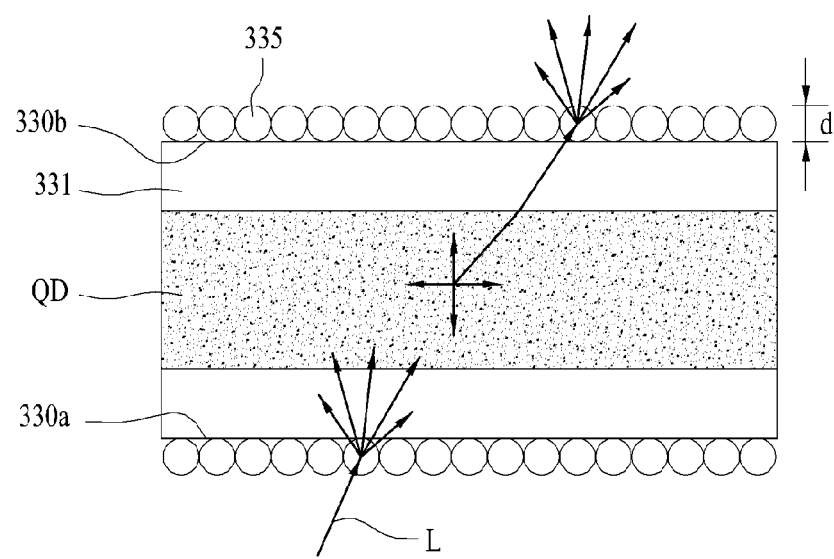
FIG. 9D is a schematic diagram for a total reflection preventing mechanism of a quantum dot filter part according to a 3rd embodiment of the present invention.

FIG. 9A is a schematic layout of a quantum dot filter part 330 according to a 3$^{rd}$ embodiment of the present invention. FIG. 9B is a schematic layout of the quantum dot filter part 330 according to an additional embodiment of the present invention shown in FIG. 9A. FIG. 9C is a schematic perspective diagram of the quantum dot filter part 330 shown in FIG. 9A and FIG. 9B. Further, FIG. 9D is a schematic diagram for a total reflection preventing mechanism of the quantum dot filter part 330 according to the 3$^{rd}$ embodiment of the present invention.

Referring to FIG. 9A, the quantum dot filter part 330 includes a total reflection preventing portion 335 built in one body of a light entrance plane 330a and/or a light exit plane 330b to prevent a total reflection of light. Further, the total reflection preventing portion 335 includes a plurality of microspheres made of a light-transmittive material.

In this instance, the microspheres are provided to the whole light entrance plane 330a and/or the whole light exit plane 330b. Preferably, a diameter (d) of each of the microspheres is set to 200 nm~2 μm. Preferably, each of the microspheres may be made of silicon dioxide (silica) or polystyrene. Alternatively, each of the microspheres may be made of such material as PET (polyethylene-terephthalate), PDMS (polydimethylsiloxane) and silicone.

Referring to FIG. 9B, the quantum dot filter part 330 according to an embodiment additional to the 3$^{rd}$ embodiment of the present invention further includes an insulating film 333 provided to at least one of the light entrance plane 330a and the light exit plane 330b. Further, a total reflection preventing portion 335 configured to prevent total reflection of light is provided to the insulating film 333. In this instance, the total reflection preventing portion 335 includes a plurality of microspheres made of a light-transmittive material.

When the insulating film 333 is provided to either the light entrance plane 330a or the light exit plane 330b of the quantum dot filter part 330, a total reflection preventing portion 335 including a plurality of the microspheres to prevent a light from being totally reflected, as shown in FIG. 9A, may be provided to the plane failing to be provided with the insulating film 333 by being formed in one body of the quantum dot filter part 330. Moreover, when the insulating film 333 is provided to either the light entrance plane 330a or the light exit plane 330b of the quantum dot filter part 330, it is preferable that the insulating film 333 may be provided to the light entrance plane 330a to which heat generated from the light source part 236 is transferred.

Preferably, the insulating film 333 may be formed of polystyrene having a good light-transmittive property and a good thermal insulation property. Regarding physical properties of polystyrene, the polystyrene has a refractive index of about 1.55 that is similar to that of a light-transmittive pipe member 331 of the quantum dot filter part 330 made of glass. Even if the insulating film 333 is provided to a surface of the quantum dot filter part 330, it has almost no influence on a propagating direction of light and has good thermal stability to efficiently cut off heat generated from the light source part 236. Moreover, the polystyrene has good molding property and is strong against mechanical defect such as scratch and the like. Thus, if the insulating film 333 is provided to the light entrance plane 330a and/or the light exit plane 330b of the quantum dot filter part 330, the durability of the quantum dots (QD) filling the quantum dot filter part 330 can be prevented from being shortened due to the heat generated from the light source part 236.

The microspheres, as shown in FIG. 9C, are provided to the whole light entrance plane 330a and/or the light exit plane 330b. Preferably, a diameter (d) of each of the microspheres is set to 200 nm~2 μm. Preferably, each of the microspheres may be made of silicon dioxide (silica) or polystyrene. Alternatively, each of the microspheres may be made of such material as PET (polyethylene-terephthalate), PDMS (polydimethylsiloxane) and silicone.

Preferably, a plurality of the microspheres are formed by a self-organization method. In particular, the microspheres are formed in a following manner. First of all, a particle layer is formed on the light entrance plane 330a and/or the light exit plane 330b of the quantum dot filter part 330 or the insulating film 333 using one of silicon dioxide (silica), PET (polyethylene-terephthalate), PDMS (polydimethylsiloxane) and silicone. Secondly, sintering is then performed on the particle layer to form/fix the microspheres on/to the light entrance plane 330a and/or the light exit plane 330b of the quantum dot filter part 330 or the insulating film 333.

When light arrives at the light entrance plane 330a and/or the light exit plane 330b at an angle over a total reflection threshold angle, the light is totally reflected in part by a flat plane, on which any microsphere is not formed, to cause a light intensity loss. Yet, referring to FIG. 9D, when light arrives at the light entrance plane 330a and/or the light exit plane 330b at an angle over a total reflection threshold angle, although the light arrives at the light entrance plane 330a and/or the light exit plane 330b at an incident angle over the total reflection threshold angle in the light entrance plane 330a and/or the light exit plane 330b including a plurality of the microspheres of the present invention and is not totally reflected by the light entrance plane 330a and/or the light exit plane 330b. Instead, the light passes through the microspheres owing to the strong forward scattering effect caused by the microspheres.

This strong forward scattering effect is called Mie scattering. In particular, the Mie scattering means an effect that most of visible rays propagate by scattering in forward direction when the visible rays arrive at a particle (i.e., microsphere having a diameter (d) of 200 nm~2 μm) having a wavelength size similar to that (e.g., about 450 nm ~700 nm) of the visible rays. In particular, the microspheres generates Mie scattering of light to prevent a total reflection of the light. Therefore, it may be able to reduce the light intensity loss. Moreover, the total reflection preventing portion 335 including a plurality of the microspheres of the present invention enables the strong straightforward light provided by the light source part 236 to pass through the quantum dot filter part 330 by generating Mie scattering. Hence, as the quantum dots (QD) are efficiently excited, a color gamut can be enhanced. Moreover, as the straightforwardness of the light is alleviated, it may be able to considerably reduce a color variation effect at the light exit plane 330b of the display panel.

Figure 10A:
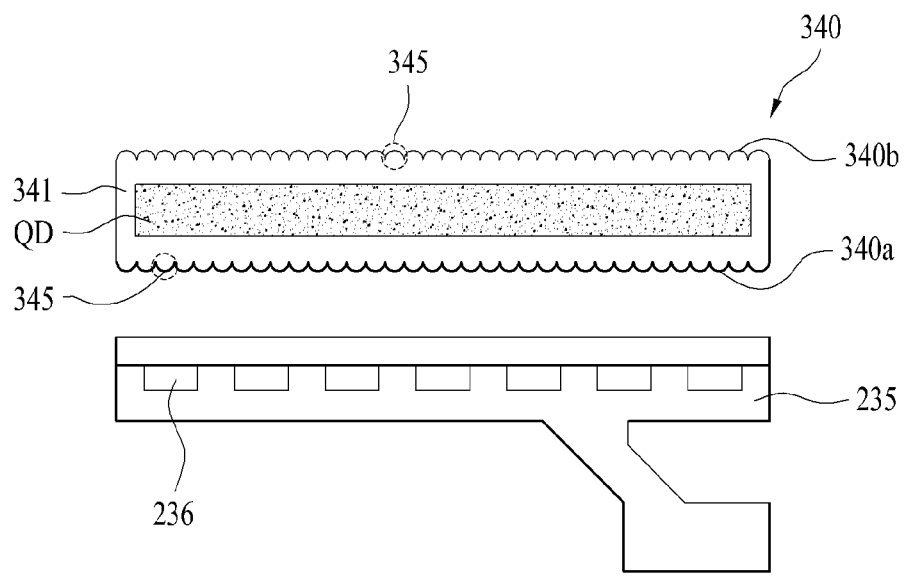
FIG. 10A is a schematic layout of a quantum dot filter part according to a 4th embodiment of the present invention.
Figure 10B:
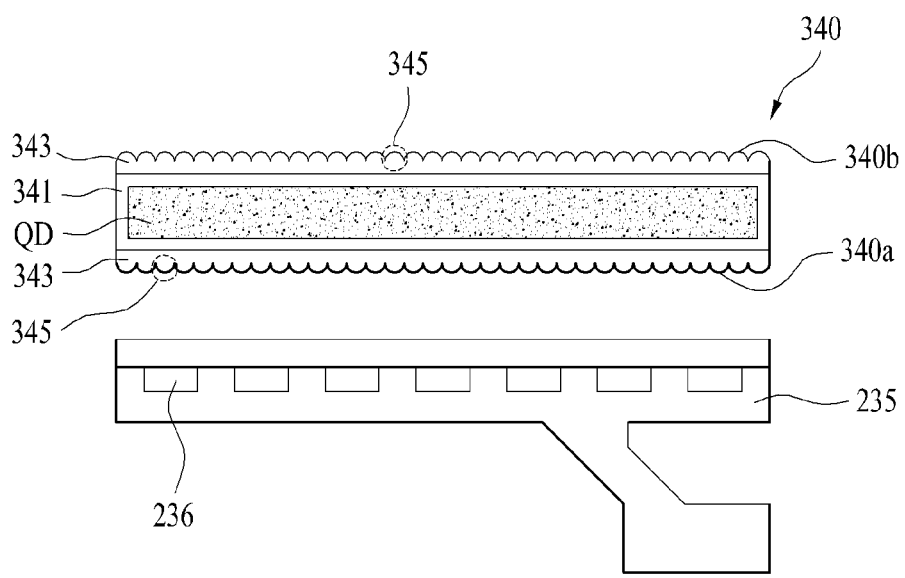
FIG. 10B is a schematic layout of a quantum dot filter part according to an additional embodiment of the present invention shown in FIG. 10A.
Figure 10C:
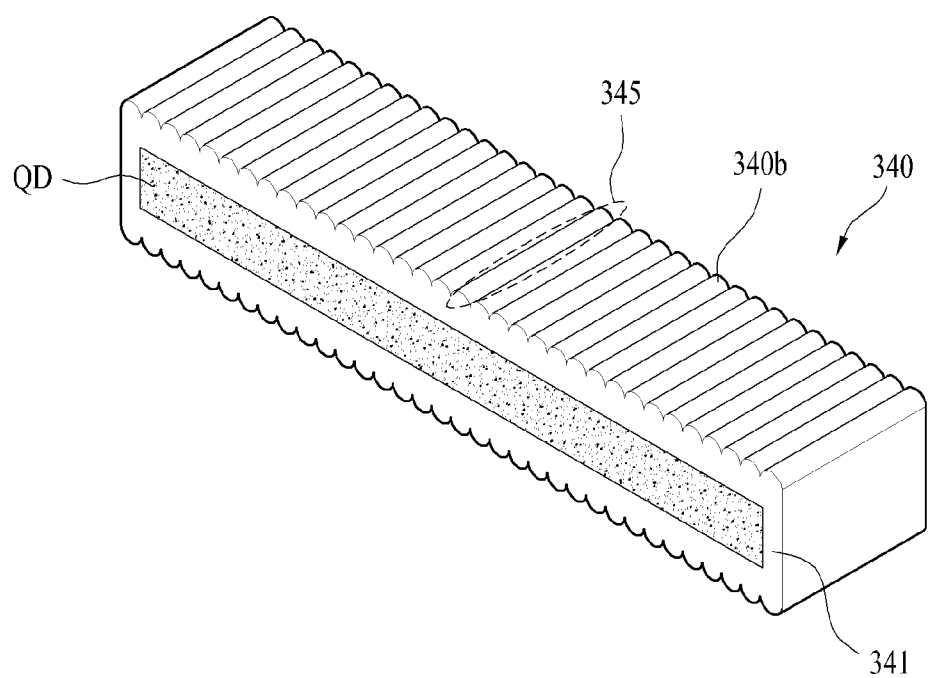
FIG. 10C is a schematic perspective diagram of a quantum dot filter part according to a 4th embodiment of the present invention.
Figure 10D:
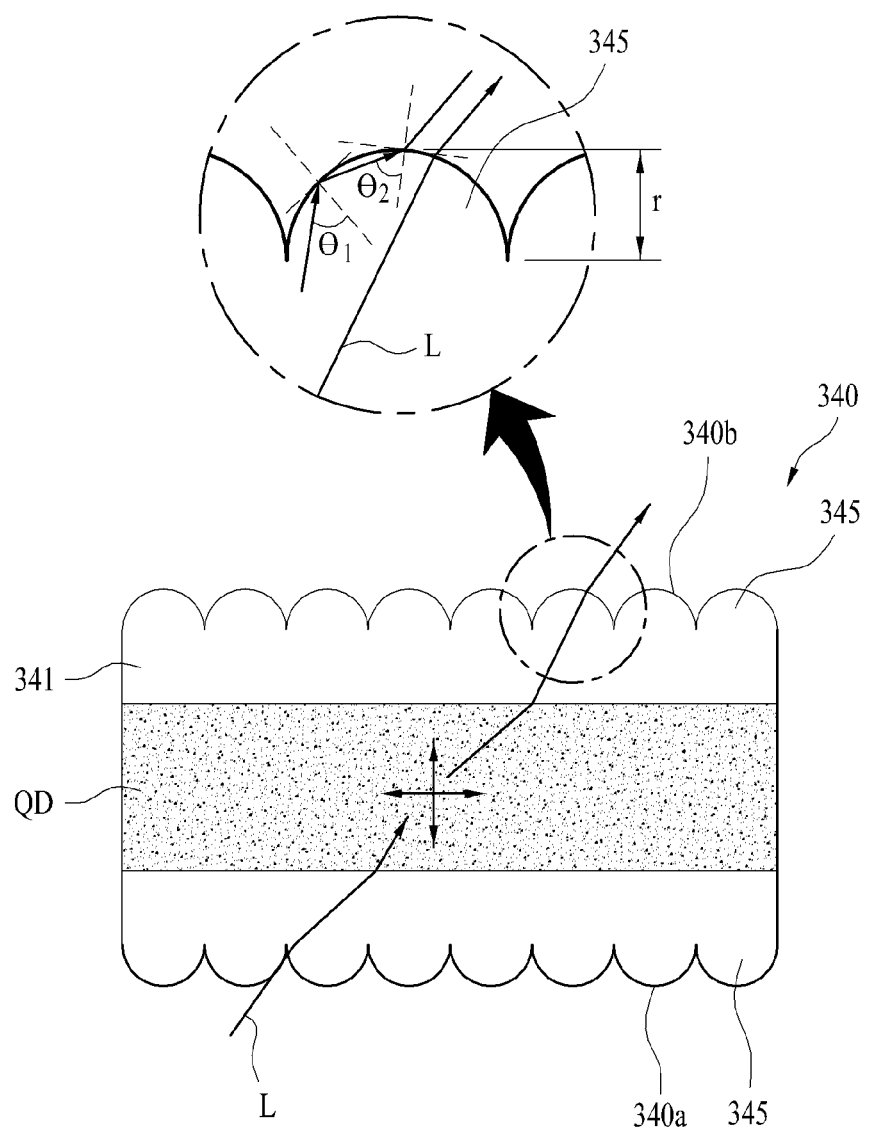
FIG. 10D is a schematic diagram for a total reflection preventing mechanism of a quantum dot filter part according to a 4th embodiment of the present invention.

Next, FIG. 10A is a schematic layout of a quantum dot filter part 340 according to a 4$^{th}$ embodiment of the present invention. FIG. 10B is a schematic layout of the quantum dot filter part 340 according to an additional embodiment of the present invention shown in FIG. 10A. FIG. 10C is a schematic perspective diagram of the quantum dot filter part 340 according to the 4$^{th}$ embodiment of the present invention. Further, FIG. 10D is a schematic diagram for a total reflection preventing mechanism of the quantum dot filter part 340 according to the 4$^{th}$ embodiment of the present invention.

Referring to FIG. 10A, the quantum dot filter part 340 includes a total reflection preventing portion 345 built in one body of a light entrance plane 340a and/or a light exit plane 340b to prevent a total reflection of light. Further, the total reflection preventing portion 345 includes a plurality of microlenses of which at least one of a horizontal cross-section and a vertical cross-section has an arc shape. In this instance, each of the microlenses may be made of a light-transmittive material.

Each of the microlenses, as shown in FIG. 10C, may have a semi-cylinder shape. Alternatively, each of the microlenses may have a hemisphere shape. The aforementioned shapes of the microlenses are exemplary, by which the present invention may be non-limited. If at least one of the vertical cross-section and the horizontal cross-section of the microlens has an arc shape, a shape of a layout of the microlens may be polygonal.

Preferably, a radius (r) of a cross-section of the arc shape of the microlens may range 1 μm to 100 μm. Further, this range of numerical values is based on experimental data. Preferably, each of the microlenses may be made of such material as PET (polyethylene-terephthalate), PDMS (polydimethylsiloxane) and silicone. Preferably, each of the microlenses may be made of silicon dioxide (silica) or polystyrene.

Referring to FIG. 10B, the quantum dot filter part 340 according to an embodiment additional to the 4$^{th}$ embodiment of the present invention further includes an insulating film 343 provided to at least one of the light entrance plane 340a and the light exit plane 340b. Further, a total reflection preventing portion 345 configured to prevent total reflection of light is provided to the insulating film 343. In this instance, the total reflection preventing portion 345 includes a plurality of microlenses of which at least one of a horizontal cross-section and a vertical cross-section has an arc shape. In this instance, the microlenses are made of a light-transmittive material.

When the insulating film 343 is provided to either the light entrance plane 340a or the light exit plane 340b of the quantum dot filter part 340, a total reflection preventing portion 345 including the microlenses to prevent light from being totally reflected, as shown in FIG. 10A, may be provided to the plane failing to be provided with the insulating film 343 by being formed in one body of the quantum dot filter part 340. Moreover, when the insulating film 343 is provided to either the light entrance plane 340a or the light exit plane 340b of the quantum dot filter part 340, it is preferable that the insulating film 343 is provided to the light entrance plane 340a to which heat generated from the light source part 236 is transferred.

Preferably, the insulating film 343 is formed of polystyrene having a good light-transmittive property and a good thermal insulation property. Regarding physical properties of polystyrene, the polystyrene has a refractive index of about 1.55 that is similar to that of a light-transmittive pipe member 341 of the quantum dot filter part 340 made of glass. Even if the insulating film 343 is provided to a surface of the quantum dot filter part 340, it has almost no influence on a propagating direction of light and has good thermal stability to efficiently cut off heat generated from the light source part 236. Moreover, the polystyrene has good molding property and is strong against mechanical defect such as scratch and the like. Thus, if the insulating film 343 is provided to the light entrance plane 340a and/or the light exit plane 340b of the quantum dot filter part 340, the durability of the quantum dots (QD) filling the quantum dot filter part 340 can be prevented from being shortened due to the heat generated from the light source part 236.

Each of the microlenses, as shown in FIG. 10C, may have a semi-cylinder shape. Alternatively, each of the microlenses may have a hemisphere shape. The aforementioned shapes of the microlenses are exemplary, by which the present invention may be non-limited. If at least one of the vertical cross-section and the horizontal cross-section of the microlens has an arc shape, a shape of a layout of the microlens may be polygonal.

Preferably, a radius (r) of a cross-section of the arc shape of the microlens may range 1 μM to 100 μm. Preferably, each of the microlenses may be made of such material as PET (polyethylene-terephthalate), PDMS (polydimethylsiloxane) and silicone. Preferably, each of the microlenses is made of silicon dioxide (silica) or polystyrene.

Preferably, the microlenses is formed by molding and curing. In particular, the microlenses may be formed in a following manner. First of all, a lens shape is prepared by performing molding on a light-transmittive material. Secondly, curing is performed on the lens-shaped light-transmittive material on the light entrance plane 340a and/or the light exit plane 340b of the quantum dot filter part 340 or a surface of the insulating film 343. Alternatively, the microlenses may be formed by lamination.

When light arrives at the light entrance plane 340a and/or the light exit plane 340b at an angle over a total reflection threshold angle, the light is totally reflected in part by a flat plane, on which any microlens is not formed, to cause a light intensity loss. Yet, referring to FIG. 10D, when light arrives at the light entrance plane 340a and/or the light exit plane 340b at an angle over a total reflection threshold angle θ1, although the light arrives at a $1^{st}$ light entrance plane 340a and/or a $1^{st}$ light exit plane 340b (cf. P1 shown in FIG. 10D) at an incident angle θ1 over the total reflection threshold angle in the light entrance plane 340a and/or the light exit plane 340b including a plurality of the microlenses of the present invention and is then totally reflected, the light enters a $2^{nd}$ light entrance plane 340a and/or a $2^{nd}$ light exit plane 340b (cf. P2 shown in FIG. 10D) at an incident angle θ2 smaller than the total reflection threshold angle and then passes through the light entrance plane 340a and/or the light exit plane 340b by being refracted by the light entrance plane 340a and/or the light exit plane 340b. Therefore, it may be able to reduce the light intensity loss.

Moreover, the total reflection preventing portion 345 including a plurality of the microlenses of the present invention enables the strong straightforward light provided by the light source part 236 to pass through the quantum dot filter part 340 by being scattered and dispersed by the total reflection preventing portion 345. Hence, as the quantum dots (QD) are efficiently excited, a color gamut can be enhanced. Moreover, as the straightforwardness of the light is alleviated, it may be able to considerably reduce a color variation effect at the light exit plane 340b of the display panel.

Preferably, the total reflection preventing portion 315/325/335/345 of the $1^{st}/2^{nd}/3^{rd}/4^{th}$ embodiment of the present invention is formed in one body of both of the light entrance plane 300a and the light exit plane 300b of the quantum dot filter part 300 or is formed on the insulating film 313/323/333/343 provided to both of the light entrance plane 300a and the light exit plane 300b of the quantum dot filter part 300. In particular, the total reflection preventing portion includes the preset surface roughness (R) 315 within the range of preventing light from being totally reflected by the light entrance plane 300a and the light exit plane 300b, a plurality of the prism shape patterns 325 each of which at least one of a horizontal cross-section and a vertical cross-section has a prism shape, a plurality of the microspheres 335 or a plurality of the convex microlenses 345 of which at least one of a horizontal cross-section and a vertical cross-section has an arc shape.

In particular, various combinations of the total reflection preventing portions according to the $1^{st}$ to $4^{th}$ embodiments may be applied to each of the light entrance plane 330a and the light exit plane 330b. For instance, the total reflection preventing portion 315 according to the $1^{st}$ embodiment (i.e., the total reflection preventing portion 315 having the preset surface roughness (R)) is provided to the light entrance plane 300a of the quantum dot filter part and the total reflection preventing portion 345 according to the $4^{th}$ embodiment (i.e., the total reflection preventing portion 345 including a plurality of the microlenses) may be provided to the light exit plane 300b of the quantum dot filter part.

Figure 11:
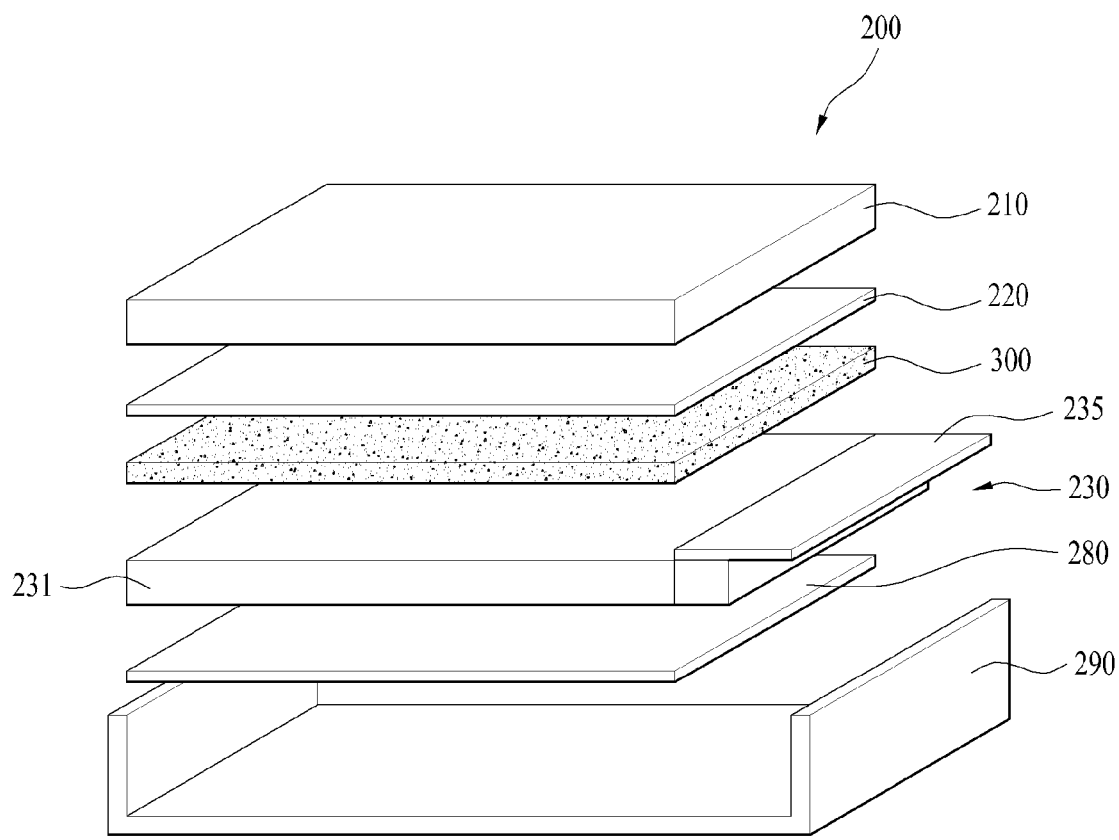
FIG. 11 is an exploded perspective diagram of a display unit according to a 2nd embodiment of the present invention.

FIG. 11 is an exploded perspective diagram of a display unit according to the $2^{nd}$ embodiment of the present invention. For reference, considering that the aforementioned display unit according to the $1^{st}$ embodiment including the edge-lit type backlight unit has the quantum dot filter part situated between the lateral side of the light guide plate and the light source part, a display unit according to the $2^{nd}$ embodiment including an edge-lit type backlight unit has a quantum dot filter part situated over a light exit plane of a light guide plate. In the following description, the redundant description of the configuration and operating principle of the display unit according to the $1^{st}$ embodiments will be omitted and the technical features of the display unit according to the $2^{nd}$ embodiment shall be explained.

Referring to FIG. 11, the display unit 200 according to the $2^{nd}$ embodiment of the present invention includes the display panel 210, the light guide plate 231 provided under the display panel 210, a plurality of light source parts 236 provided to a lateral side of the light guide plate 231 by being spaced apart from each other, and a quantum dot filter part including quantum dots (QD), the quantum dot filter part provided between the light guide plate 231 and the display panel 210, the quantum dot filter part having a light entrance plane 300a to which light discharged from the light guide plate 231 is input and a light exit plane 300b from which the light is discharged by being wavelength-transformed by the quantum dots (QD). Further, at least one of the light entrance plane 300a and the light exit plane 300b of the quantum dot filter part 300 may be provided with a total reflection preventing portion.

Comparing the display unit of the $1^{st}$ embodiment and the display unit of the $2^{nd}$ embodiment with each other, the display unit of the $1^{st}$ embodiment includes the light source part provided to the lateral side of the light guide plate and the quantum dot filter part is arranged between the light guide plate and the light source part, whereas the display unit of the $2^{nd}$ embodiment has the light source part provided to the lateral side of the light guide plate and the quantum dot filter part is arranged over the light guide plate. Further, the rest of the components of the display unit of the $1^{st}$ embodiment and the display unit of the $2^{nd}$ embodiment are identical to each other.

A size of the light entrance plane 300a and the light exit plane 300b of the quantum dot filer part 300 included in the display unit 200 according to the $2^{nd}$ embodiment may be equal or similar to a size of the display panel 210 and/or a size of the light exit plane 231b of the light guide plate 231.

In the following description, 5th to 8th embodiments for the quantum dot filter part 300 included in the display unit 200 according to the 2nd embodiment are explained.

Figure 12A:
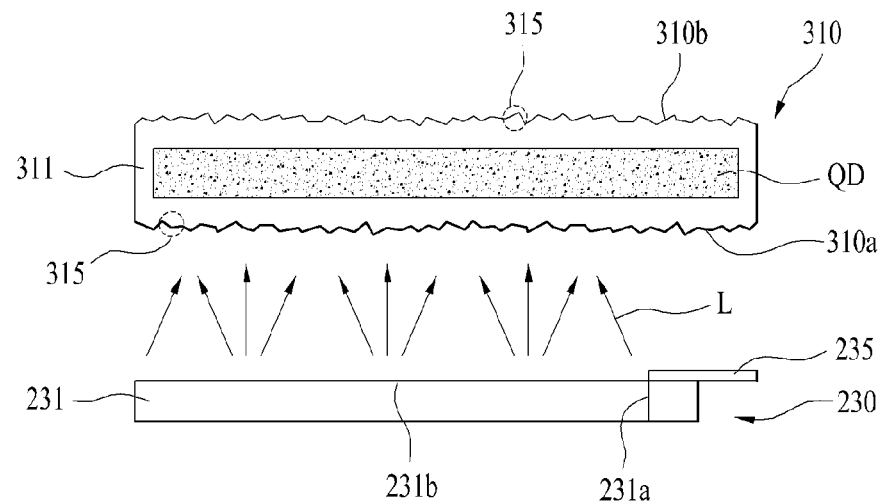
FIG. 12A is a schematic layout of a quantum dot filter part according to a 5th embodiment of the present invention.

FIG. 12A is a schematic layout of the quantum dot filter part 310 according to a 5th embodiment of the present invention. Referring to FIG. 12A, the quantum dot filter part 310 includes the total reflection preventing portion 315 provided to the light entrance plane 310a and/or the light exit plane 310b of the quantum dot filter part 310 to prevent a total reflection of light. Further, the total reflection preventing portion 315 of the present embodiment includes a preset surface roughness within a range of preventing light from being totally reflected by the light entrance plane 310a and/or the light exit plane 310b. The quantum dot filter part 310 according to the 5th embodiment, as observed from FIG. 7A and FIG. 12A, has the configuration and structure similar or equal to those of the quantum dot filter part 310 according to the 1st embodiment. In order to avoid the redundant description, the same technical features and operating principles as the quantum dot filter part 310 of the 1st embodiment are omitted in the following description.

Preferably, the preset surface roughness may be set to a range of 1 μm~100 μm. As an embodiment additional to the 5th embodiment, the light entrance plane 310a and/or the light exit plane 310b of the quantum dot filter part 310 may further include an insulating film, which is similar to the configuration shown in FIG. 7B. The total reflection preventing portion 315 having a preset surface roughness within a range of preventing light from being reflected by the light entrance plane 310a and/or the light exit plane 310b is formed on the insulating film. Hence, the durability of quantum dots (QD) included in the quantum dot filter part 310 can be improved.

Referring to FIG. 12A, a moving path of light by the quantum dot filter part 310 according to the 5th embodiment in the display unit according to the 2nd embodiment is described as follows. First of all, light having a strong straightforwardness is emitted from a plurality of the light source parts 236 and is then incident on the light entrance plane 310a of the light guide plate 231. The light (i.e., a point light source) incident on the light entrance plane 310a of the light guide plate 231 is scattered within the light guide plate 231 and is then discharged as a scattered light via the light exit plane 310b of the light guide plate 231 by being transformed into a surface light source. Most of the light discharged as the scattered light from the light guide plate 231 by being transformed into the surface light source then enters the quantum dot filter part 310 by the total reflection preventing portion 315 formed with the preset surface roughness on the light entrance plane 310a (or the insulating film provided to the light entrance plane 310a) of the quantum dot filter part 310. The light having entered the quantum dot filter part 310 is wavelength-transformed by the quantum dots (QD). Thereafter, most of the wavelength-transformed light is discharged from the quantum dot filter part 310 by the total reflection preventing portion 315 formed on the light exit plane 310b (or the light entrance plane 310a) of the quantum dot filter part 310 with the preset surface roughness and is then incident on the diffuser sheet or the display panel 210.

Thus, as the quantum dot filter part 310 is provided with the total reflection preventing portion 315 and is also arranged over the light guide plate 231, the light having the straightforwardness weakened by the light guide plate 231 is incident on the light entrance plane 310a of the quantum dot filter part 310 and its straightforwardness is then further weakened by the total reflection preventing portion 315 provided to the light entrance plane 310a of the quantum dot filter part 310. Therefore, it may be able to eliminate a color variation effect on the light exit plane 310b of the display panel 210. Moreover, as the quantum dot filter part 310 is provided with the total reflection preventing portion 315 and is also arranged over the light guide plate 231, most of the scattered light by the light guide plate 231 is incident on the light entrance plane 310a of the quantum dot filter part 310 at an angle smaller than the total reflection threshold angle and the preset surface roughness of the total reflection preventing portion 315 also prevents the total reflection of the light one more time. Therefore, it may be able to eliminate the total reflection of the light almost completely from the light entrance plane 310a and the light exit plane 310b of the quantum dot filter part 310.

Figure 12B:
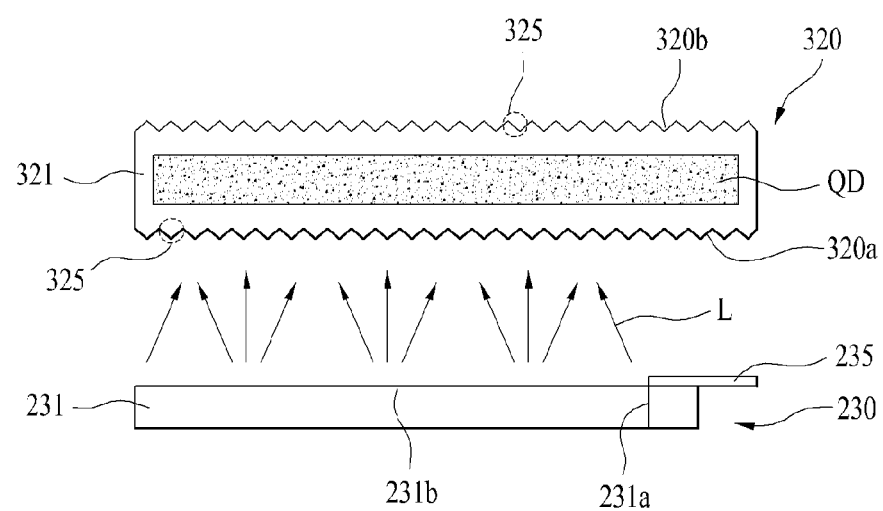
FIG. 12B is a schematic layout of a quantum dot filter part according to a 6th embodiment of the present invention.

FIG. 12B is a schematic layout of the quantum dot filter part 320 according to a 6th embodiment of the present invention. Referring to FIG. 12B, the quantum dot filter part 320 includes a total reflection preventing portion 325 provided to a light entrance plane 320a and/or a light exit plane 320b of the quantum dot filter part 320 to prevent a total reflection of light. Further, the total reflection preventing portion 325 of the present embodiment includes a plurality of prism shape patterns of which at least one of a horizontal cross-section and a vertical cross-section has a prism shape. The quantum dot filter part 320 according to the 6th embodiment, as observed from FIG. 8A and FIG. 12B, has the configuration and structure similar or equal to those of the quantum dot filter part 320 according to the 2nd embodiment. In order to avoid the redundant description, the same technical features and operating principles as the quantum dot filter part 320 of the 2nd embodiment shall be omitted in the following description.

Preferably, a unit pattern of the prism shape pattern may have a trigonal prism shape or a trigonal pyramid shape. Preferably, a pitch of the prism shape pattern may range 10 μm to 100 μm. Preferably, a prism angle of the prism shape pattern may range 70 degrees to 110 degrees.

As an embodiment additional to the 6th embodiment, the light entrance plane 320a and/or the light exit plane 320b of the quantum dot filter part 320 may further include an insulating film, which is similar to the configuration shown in FIG. 8B. Further, the insulating film includes a plurality of prism shape patterns of which at least one of a horizontal cross-section and a vertical cross-section has a prism shape to prevent light from being reflected by the light entrance plane 320a and/or the light exit plane 320b. Hence, it may be able to extend durability of quantum dots (QD) included in the quantum dot filter part 320.

Referring to FIG. 12B, a moving path of light by the quantum dot filter part 320 according to the 6th embodiment in the display unit according to the 2nd embodiment is described as follows. First of all, light having a strong straightforwardness is emitted from a plurality of the light source parts 236 and is then incident on the light entrance plane 320a of the light guide plate 231. The light (i.e., a point light source) incident on the light entrance plane 320a of the light guide plate 231 is scattered within the light guide plate 231 and is then discharged as a scattered light via the light exit plane 320b of the light guide plate 231 by being transformed into a surface light source.

Most of the light discharged as the scattered light from the light guide plate 231 by being transformed into the surface light source then enters the quantum dot filter part 320 by the total reflection preventing portion 325 including a plurality of the prism shapes formed on the light entrance plane 320a (or the insulating film provided to the light entrance plane 320a) of the quantum dot filter part 320. The light having entered the quantum dot filter part 320 is wavelength-transformed by the quantum dots (QD). Thereafter, most of the wavelength-transformed light is discharged from the quantum dot filter part 320 by the total reflection preventing portion 325 including a plurality of the prism shapes formed on the light exit plane 320b (or the light entrance plane 320a) of the quantum dot filter part 320 and is then incident on the diffuser sheet or the display panel 210.

Thus, as the quantum dot filter part 320 is provided with the total reflection preventing portion 325 and is also arranged over the light guide plate 231, the light having the straightforwardness weakened by the light guide plate 231 is incident on the light entrance plane 320a of the quantum dot filter part 320 and its straightforwardness is then further weakened by the total reflection preventing portion 325 provided to the light entrance plane 320a of the quantum dot filter part 320. Therefore, it may be able to eliminate a color variation effect on the light exit plane 320b of the display panel 210. Moreover, as the quantum dot filter part 320 is provided with the total reflection preventing portion 325 and is also arranged over the light guide plate 231, most of the scattered light by the light guide plate 231 is incident on the light entrance plane 320a of the quantum dot filter part 320 at an angle smaller than the total reflection threshold angle and a plurality of the prism shapes of the total reflection preventing portion 325 also prevent the total reflection of the light one more time. Therefore, it may be able to eliminate the total reflection of the light almost completely from the light entrance plane 320a and the light exit plane 320b of the quantum dot filter part 320.

Figure 12C:
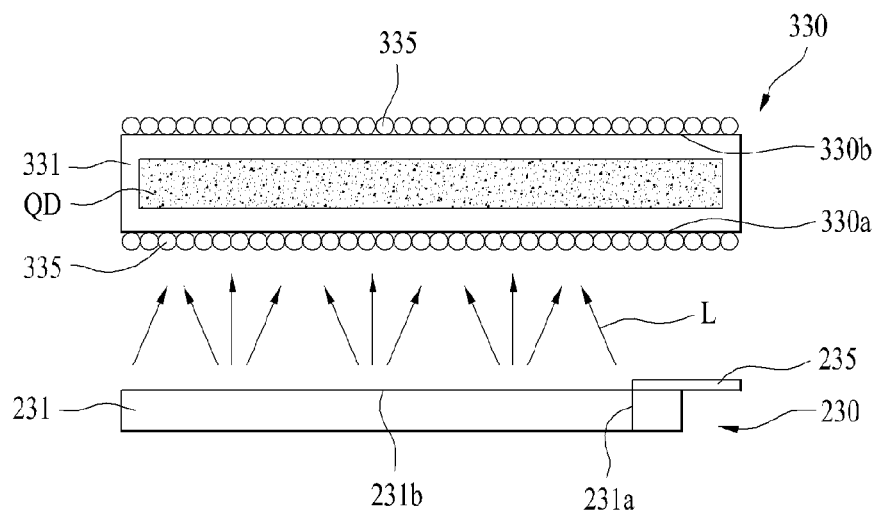
FIG. 12C is a schematic layout of a quantum dot filter part according to a 7th embodiment of the present invention.

FIG. 12C is a schematic layout of a quantum dot filter part 330 according to a 7$^{th}$ embodiment of the present invention. Referring to FIG. 12C, the quantum dot filter part 330 includes a total reflection preventing portion 335 provided to a light entrance plane 330a and/or a light exit plane 330b of the quantum dot filter part 330 to prevent a total reflection of light. Further, the total reflection preventing portion 335 of the present embodiment includes a plurality of microspheres. The quantum dot filter part 330 according to the 7$^{th}$ embodiment, as observed from FIG. 9A and FIG. 12C, has the configuration and structure similar or equal to those of the quantum dot filter part 330 according to the 3$^{rd}$ embodiment. In order to avoid the redundant description, the same technical features and operating principles as the quantum dot filter part 330 of the 3$^{rd}$ embodiment shall be omitted in the following description.

Preferably, a diameter of each of the microspheres is set to 200 nm~2 μm. Preferably, each of the microspheres may be made of one of silicon dioxide (silica), polystyrene, PET (polyethylene-terephthalate), PDMS (polydimethylsiloxane) and silicone.

As an embodiment additional to the 7$^{th}$ embodiment, the light entrance plane 330a and/or the light exit plane 330b of the quantum dot filter part 330 may further include an insulating film, which is similar to the configuration shown in FIG. 9B. Further, the insulating film includes a plurality of microspheres to prevent light from being reflected by the light entrance plane 330a and/or the light exit plane 330b. Hence, it may be able to extend durability of quantum dots (QD) included in the quantum dot filter part 330.

Referring to FIG. 12C, a moving path of light by the quantum dot filter part 330 according to the 7$^{th}$ embodiment in the display unit according to the 2$^{nd}$ embodiment is described as follows. First of all, light having a strong straightforwardness is emitted from a plurality of the light source parts 236 and is then incident on the light entrance plane 330a of the light guide plate 231. The light (i.e., a point light source) incident on the light entrance plane 330a of the light guide plate 231 is scattered within the light guide plate 231 and is then discharged as a scattered light via the light exit plane 330b of the light guide plate 231 by being transformed into a surface light source.

Most of the light discharged as the scattered light from the light guide plate 231 by being transformed into the surface light source then enters the quantum dot filter part 330 by the total reflection preventing portion 335 including a plurality of the microspheres formed on the light entrance plane 330a (or the insulating film provided to the light entrance plane 330a) of the quantum dot filter part 330. The light having entered the quantum dot filter part 330 is wavelength-transformed by the quantum dots (QD). Thereafter, most of the wavelength-transformed light is discharged from the quantum dot filter part 330 by the total reflection preventing portion 335 including a plurality of the microspheres formed on the light exit plane 330b (or the light entrance plane 330a) of the quantum dot filter part 330 and is then incident on the diffuser sheet or the display panel 210.

Thus, as the quantum dot filter part 330 is provided with the total reflection preventing portion 335 and is also arranged over the light guide plate 231, the light having the straightforwardness weakened by the light guide plate 231 is incident on the light entrance plane 330a of the quantum dot filter part 330 and its straightforwardness is then further weakened by the total reflection preventing portion 335 provided to the light entrance plane 330a of the quantum dot filter part 330. Therefore, it may be able to eliminate a color variation effect on the light exit plane 330b of the display panel 210.

Moreover, as the quantum dot filter part 330 is provided with the total reflection preventing portion 335 and is also arranged over the light guide plate 231, most of the scattered light by the light guide plate 231 is incident on the light entrance plane 330a of the quantum dot filter part 330 at an angle smaller than the total reflection threshold angle and a plurality of the microspheres of the total reflection preventing portion 335 also prevent the total reflection of the light one more time. Therefore, it may be able to eliminate the total reflection of the light almost completely from the light entrance plane 330a and the light exit plane 330b of the quantum dot filter part 330.

Figure 12D:
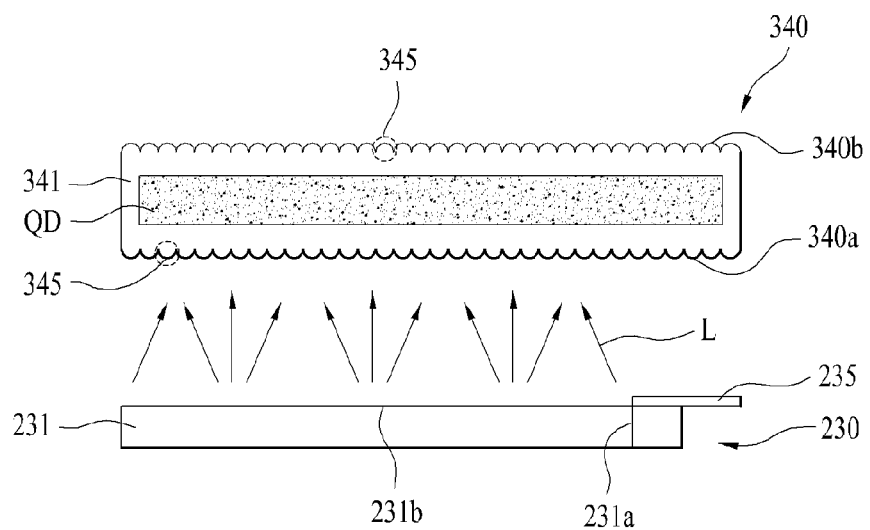
FIG. 12D is a schematic layout of a quantum dot filter part according to an 8th embodiment of the present invention.

FIG. 12D is a schematic layout of a quantum dot filter part 340 according to an 8$^{th}$ embodiment of the present invention. Referring to FIG. 12D, the quantum dot filter part 340 includes a total reflection preventing portion 345 provided to a light entrance plane 340a and/or a light exit plane 340b of the quantum dot filter part 340 to prevent a total reflection of light. Further, the total reflection preventing portion 345 of the present embodiment includes a plurality of microlenses of which at least one of a horizontal cross-section and a vertical cross-section has an arc shape. The quantum dot filter part 340 according to the 8$^{th}$ embodiment, as observed from FIG. 10A and FIG. 12D, has the configuration and structure similar or equal to those of the quantum dot filter part 340 according to the 4$^{th}$ embodiment. In order to avoid the redundant description, the same technical features and operating principles as the quantum dot filter part 340 of the 4$^{th}$ embodiment shall be omitted in the following description.

Preferably, a radius of a cross-section of the microlens may range 1 μm to 100 μm. Preferably, each of the microlenses may have a semi-cylinder shape or a hemisphere shape. Preferably, each of the microlenses may be made of such material as silicon dioxide (silica), polystyrene, PET (polyethylene-terephthalate), PDMS (polydimethylsiloxane) and silicone.

As an embodiment additional to the 8$^{th}$ embodiment, the light entrance plane 340a and/or the light exit plane 340b of the quantum dot filter part 340 may further include an insulating film, which is similar to the configuration shown in FIG. 10B. Further, the insulating film includes a plurality of microlenses of which at least one of a horizontal cross-section and a vertical cross-section has an arc shape to prevent light from being reflected by the light entrance plane 340a and/or the light exit plane 340b. Hence, it may be able to extend durability of quantum dots (QD) included in the quantum dot filter part 340.

Referring to FIG. 12D, a moving path of light by the quantum dot filter part 340 according to the $8^{th}$ embodiment in the display unit according to the $2^{nd}$ embodiment is described as follows. First of all, light having a strong straightforwardness is emitted from a plurality of the light source parts 236 and is then incident on the light entrance plane 340a of the light guide plate 231. The light (i.e., a point light source) incident on the light entrance plane 340a of the light guide plate 231 is scattered within the light guide plate 231 and is then discharged as a scattered light via the light exit plane 340b of the light guide plate 231 by being transformed into a surface light source.

Most of the light discharged as the scattered light from the light guide plate 231 by being transformed into the surface light source then enters the quantum dot filter part 340 by the total reflection preventing portion 345 including a plurality of the microlenses formed on the light entrance plane 340a (or the insulating film provided to the light entrance plane 340a) of the quantum dot filter part 340. The light having entered the quantum dot filter part 340 is wavelength-transformed by the quantum dots (QD). Thereafter, most of the wavelength-transformed light is discharged from the quantum dot filter part 340 by the total reflection preventing portion 345 including a plurality of the microlenses formed on the light exit plane 340b (or the light entrance plane 340a) of the quantum dot filter part 340 and is then incident on the diffuser sheet or the display panel 210.

Thus, as the quantum dot filter part 340 is provided with the total reflection preventing portion 345 and is also arranged over the light guide plate 231, the light having the straightforwardness weakened by the light guide plate 231 is incident on the light entrance plane 340a of the quantum dot filter part 340 and its straightforwardness is then further weakened by the total reflection preventing portion 345 provided to the light entrance plane 340a of the quantum dot filter part 340. Therefore, it may be able to eliminate a color variation effect on the light exit plane 340b of the display panel 210.

Moreover, as the quantum dot filter part 340 is provided with the total reflection preventing portion 345 and is also arranged over the light guide plate 231, most of the scattered light by the light guide plate 231 is incident on the light entrance plane 340a of the quantum dot filter part 340 at an angle smaller than the total reflection threshold angle and a plurality of the microlenses of the total reflection preventing portion 345 also prevent the total reflection of the light one more time. Therefore, it may be able to eliminate the total reflection of the light almost completely from the light entrance plane 340a and the light exit plane 340b of the quantum dot filter part 340.

Preferably, each of the total reflection preventing portions of the $5^{th}$ to $8^{th}$ embodiments of the present invention may be formed in one body of both of the light entrance plane and the light exit plane of the quantum dot filter part or may be formed on the insulating film provided to both of the light entrance plane and the light exit plane of the quantum dot filter part. In particular, the total reflection preventing portion may include the preset surface roughness within the range of preventing light from being totally reflected by the light entrance plane and the light exit plane, a plurality of the prism shape patterns each of which at least one of a horizontal cross-section and a vertical cross-section has a prism shape, a plurality of the microspheres, or a plurality of the convex microlenses each of which at least one of a horizontal cross-section and a vertical cross-section has an arc shape.

In particular, various combinations of the total reflection preventing portions according to the $5^{th}$ to $8^{th}$ embodiments may be applied to each of the light entrance plane and the light exit plane. For instance, the total reflection preventing portion according to the $5^{th}$ embodiment (i.e., the total reflection preventing portion having the preset surface roughness) is provided to the light entrance plane of the quantum dot filter part and the total reflection preventing portion according to the $8^{th}$ embodiment (i.e., the total reflection preventing portion including a plurality of the microlenses) may be provided to the light exit plane of the quantum dot filter part.

Figure 13:
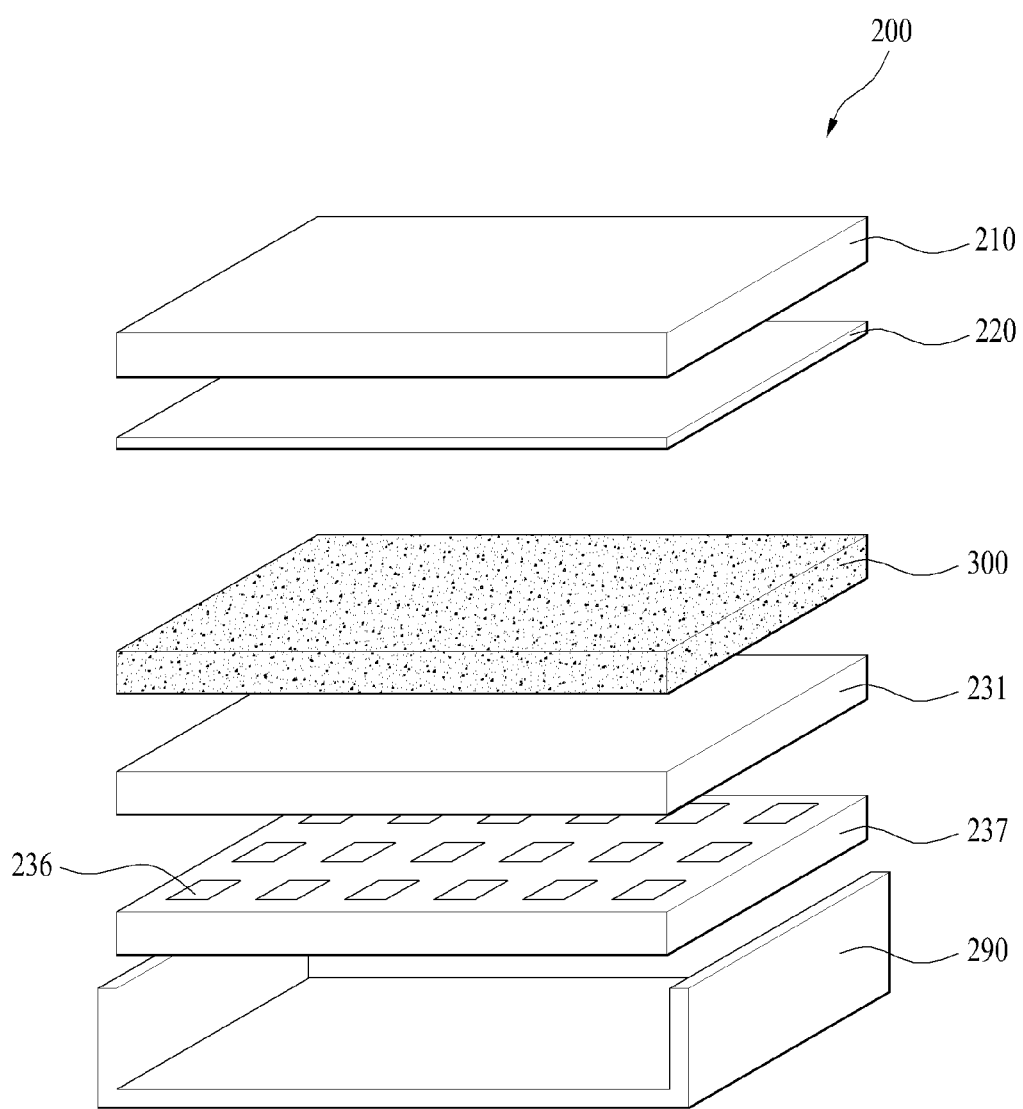
FIG. 13 is an exploded perspective diagram of a display unit according to a 3rd embodiment of the present invention.

FIG. 13 is an exploded perspective diagram of the display unit 200 according to the $3^{rd}$ embodiment of the present invention. For reference, considering that the aforementioned display unit according to the $1^{st}$ embodiment including the edge-lit type backlight unit has the quantum dot filter part situated between the lateral side of the light guide plate and the light source part, a display unit according to a $3^{rd}$ embodiment including a direct-lit type backlight unit has a quantum dot filter part situated over a light exit plane of a light guide plate. In the following description, the redundant description of the configuration and operating principle of the display unit according to the $1^{st}$ embodiments will be omitted and the technical features of the display unit according to the $3^{rd}$ embodiment shall be explained.

Referring to FIG. 13, the display unit 200 includes the display panel 210, the light guide plate 231 provided under the display panel 210, a plurality of light source parts 236 provided under the light guide plate 231 by being spaced apart from each other, and a quantum dot filter part including quantum dots (QD), the quantum dot filter part provided between the light guide plate 231 and the display panel 210 or between the light source parts 236 and the light guide plate 231, the quantum dot filter part having a light entrance plane 300a to which light discharged from the light guide plate 231 is input and a light exit plane 300b from which the light is discharged by being wavelength-transformed by the quantum dots (QD). Further, at least one of the light entrance plane 300a and the light exit plane 300b of the quantum dot filter part 300 may be provided with a total reflection preventing portion.

Comparing the display unit of the $1^{st}$ embodiment and the display unit of the $3^{rd}$ embodiment with each other, the display unit of the $1^{st}$ embodiment includes the light source part provided to the lateral side of the light guide plate and the quantum dot filter part is arranged between the light guide plate and the light source part, whereas the display unit of the $3^{rd}$ embodiment has the light source part provided under the light guide plate to have the light entrance plane and the light exit plane of the light guide plate arranged in parallel with each other and the quantum dot filter part is arranged over the light guide plate (i.e., next to the light exit plane of the light guide plate). Further, the rest of the components of the display unit of the $1^{st}$ embodiment and the display unit of the $3^{rd}$ embodiment are identical to each other.

A size of the light entrance plane 300a and the light exit plane 300b of the quantum dot filer part 300 included in the display unit 200 according to the $3^{rd}$ embodiment may be equal or similar to a size of the display panel 210 and/or a size of the light exit plane 231b of the light guide plate 231.

In the following description, $9^{th}$ to $12^{th}$ embodiments for the quantum dot filter part 300 included in the display unit 200 according to the $3^{rd}$ embodiment are explained.

Figure 14A:
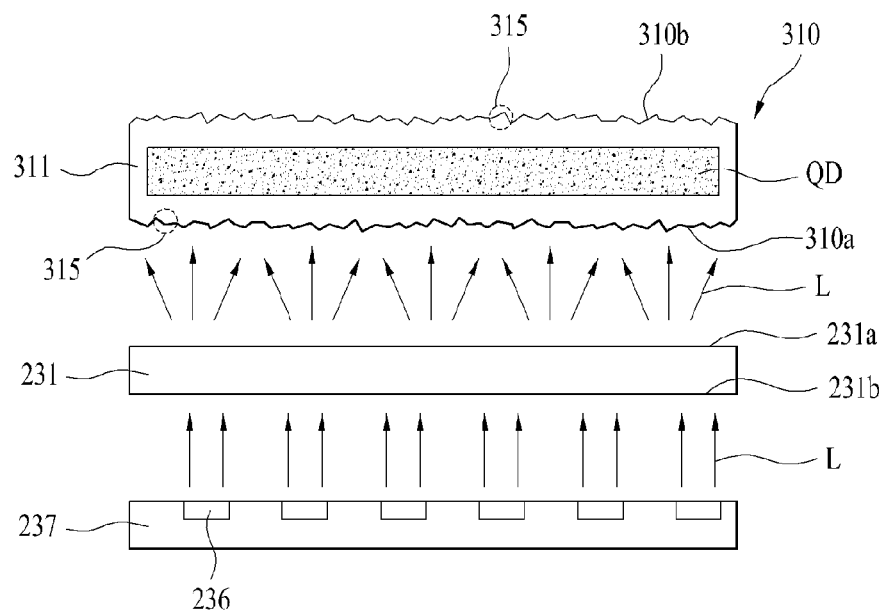
FIG. 14A is a schematic layout of a quantum dot filter part according to a 9th embodiment of the present invention.

FIG. 14A is a schematic layout of a quantum dot filter part 310 according to a 9th embodiment of the present invention. Referring to FIG. 14A, the quantum dot filter part 310 includes a total reflection preventing portion 315 provided to a light entrance plane 310a and/or a light exit plane 310b of the quantum dot filter part 310 to prevent a total reflection of light. Further, the total reflection preventing portion 315 of the present embodiment includes a preset surface roughness within a range of preventing light from being totally reflected by the light entrance plane 310a and/or the light exit plane 310b. The quantum dot filter part 310 according to the 9th embodiment, as observed from FIG. 7A and FIG. 14A, has the configuration and structure similar or equal to those of the quantum dot filter part 310 according to the 1st embodiment. In order to avoid the redundant description, the same technical features and operating principles as the quantum dot filter part 310 of the 1st embodiment shall be omitted in the following description.

Preferably, the preset surface roughness may be set to a range of 1 μm~100 μm, which is based on experimental data. As an embodiment additional to the 9th embodiment, the light entrance plane 310a and/or the light exit plane 310b of the quantum dot filter part 310 may further include an insulating film, which is similar to the configuration shown in FIG. 7B. A total reflection preventing portion 315 having a preset surface roughness within a range of preventing light from being reflected by the light entrance plane 310a and/or the light exit plane 310b is formed on the insulating film. Hence, it may be able to extend durability of quantum dots (QD) included in the quantum dot filter part 310.

Referring to FIG. 14A, a moving path of light by the quantum dot filter part 310 according to the 9th embodiment in the display unit according to the 3rd embodiment is described as follows. First of all, light having a strong straightforwardness is emitted from a plurality of the light source parts 236 and is then incident on the light entrance plane 310a of the light guide plate 231. The light (i.e., a point light source) incident on the light entrance plane 310a of the light guide plate 231 is scattered within the light guide plate 231 and is then discharged as a scattered light via the light exit plane 310b of the light guide plate 231 by being transformed into a surface light source. Most of the light discharged as the scattered light from the light guide plate 231 by being transformed into the surface light source then enters the quantum dot filter part 310 by the total reflection preventing portion 315 formed with the preset surface roughness on the light entrance plane 310a (or the insulating film provided to the light entrance plane 310a) of the quantum dot filter part 310. The light having entered the quantum dot filter part 310 is wavelength-transformed by the quantum dots (QD). Thereafter, most of the wavelength-transformed light is discharged from the quantum dot filter part 310 by the total reflection preventing portion 315 formed on the light exit plane 310b (or the insulating film provided to the light entrance plane 310a) of the quantum dot filter part 310 with the preset surface roughness and is then incident on the diffuser sheet or the display panel 210.

Thus, as the quantum dot filter part 310 is provided with the total reflection preventing portion 315 and is also arranged over the light guide plate 231, most of the scattered light by the light guide plate 231 is incident on the light entrance plane 310a of the quantum dot filter part 310 at an angle smaller than the total reflection threshold angle and the preset surface roughness of the total reflection preventing portion 315 also prevents the total reflection of the light one more time. Therefore, it may be able to eliminate the total reflection of the light almost completely from the light entrance plane 310a and the light exit plane 310b of the quantum dot filter part 310.

Figure 14B:
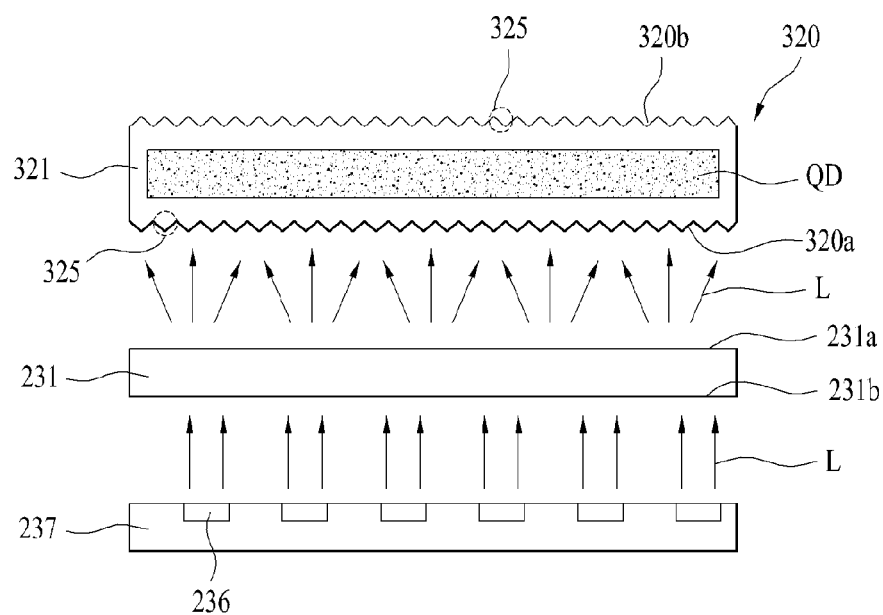
FIG. 14B is a schematic layout of a quantum dot filter part according to a 10th embodiment of the present invention.

FIG. 14B is a schematic layout of the quantum dot filter part 320 according to a 10th embodiment of the present invention. Referring to FIG. 14B, the quantum dot filter part 320 includes a total reflection preventing portion 325 provided to the light entrance plane 320a and/or the light exit plane 320b of the quantum dot filter part 320 to prevent a total reflection of light. Further, the total reflection preventing portion 325 of the present embodiment includes a plurality of prism shape patterns each of which at least one of a horizontal cross-section and a vertical cross-section has a prism shape. The quantum dot filter part 320 according to the 10th embodiment, as observed from FIG. 8A and FIG. 14B, has the configuration and structure similar or equal to those of the quantum dot filter part 320 according to the 2nd embodiment. In order to avoid the redundant description, the same technical features and operating principles as the quantum dot filter part 320 of the 2nd embodiment shall be omitted in the following description.

Preferably, a unit pattern of the prism shape pattern may have a trigonal prism shape or a trigonal pyramid shape. Preferably, a pitch of the prism shape pattern may range 10 μm to 100 μm. Preferably, a prism angle of the prism shape pattern may range 70 degrees to 110 degrees.

As an embodiment additional to the 10th embodiment, the light entrance plane 320a and/or the light exit plane 320b of the quantum dot filter part 320 may further include an insulating film, which is similar to the configuration shown in FIG. 8B. Further, the insulating film may include a plurality of prism shape patterns each of which at least one of a horizontal cross-section and a vertical cross-section has a prism shape to prevent light from being reflected by the light entrance plane 320a and/or the light exit plane 320b. Hence, it may be able to extend durability of quantum dots (QD) included in the quantum dot filter part 320.

Referring to FIG. 14B, a moving path of light by the quantum dot filter part 320 according to the 10th embodiment in the display unit according to the 3rd embodiment is described as follows. First of all, light having a strong straightforwardness is emitted from a plurality of the light source parts 236 and is then incident on the light entrance plane 320a of the light guide plate 231. The light (i.e., a point light source) incident on the light entrance plane 320a of the light guide plate 231 is scattered within the light guide plate 231 and is then discharged as a scattered light via the light exit plane 320b of the light guide plate 231 by being transformed into a surface light source. Most of the light discharged as the scattered light from the light guide plate 231 by being transformed into the surface light source then enters the quantum dot filter part 320 by the total reflection preventing portion 325 including a plurality of the prism shapes formed on the light entrance plane 320a (or the insulating film provided to the light entrance plane 320a) of the quantum dot filter part 320. The light having entered the quantum dot filter part 320 is wavelength-transformed by the quantum dots (QD).

Thereafter, most of the wavelength-transformed light is discharged from the quantum dot filter part 320 by the total reflection preventing portion 325 including a plurality of the prism shapes formed on the light exit plane 320b (or the insulating film provided to the light entrance plane 320a) of the quantum dot filter part 320 and is then incident on the diffuser sheet or the display panel 210.

Thus, as the quantum dot filter part 320 is provided with the total reflection preventing portion 325 and is also arranged over the light guide plate 231, most of the scattered light by the light guide plate 231 is incident on the light entrance plane 320a of the quantum dot filter part 320 at an angle smaller than the total reflection threshold angle and a plurality of the prism shapes of the total reflection preventing portion 325 also prevent the total reflection of the light one more time. Therefore, it may be able to eliminate the total reflection of the light almost completely from the light entrance plane 320a and the light exit plane 320b of the quantum dot filter part 320.

Figure 14C:
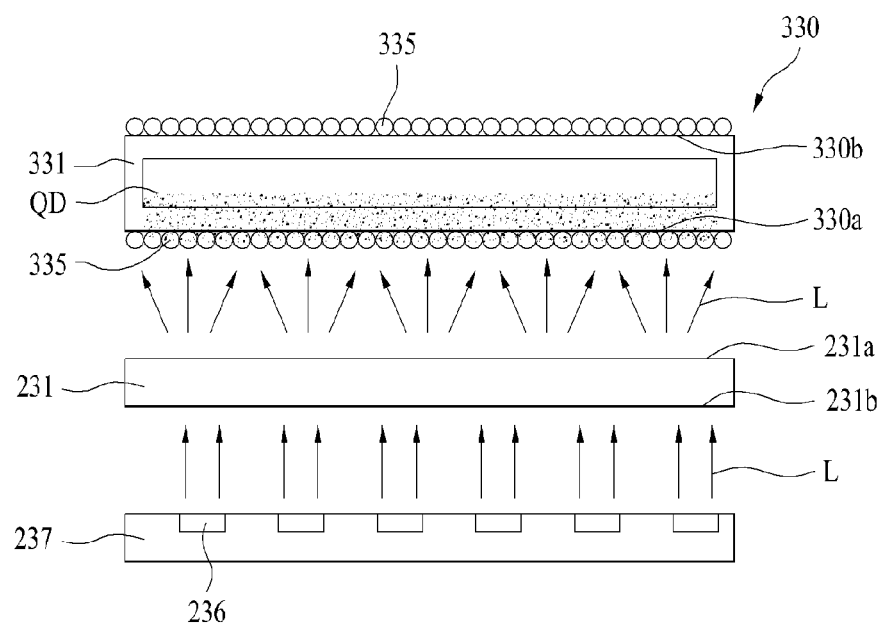
FIG. 14C is a schematic layout of a quantum dot filter part according to am 11th embodiment of the present invention.

FIG. 14C is a schematic layout of a quantum dot filter part 330 according to an $11^{th}$ embodiment of the present invention. Referring to FIG. 14C, the quantum dot filter part 330 includes a total reflection preventing portion 335 provided to a light entrance plane 330a and/or a light exit plane 330b of the quantum dot filter part 330 to prevent a total reflection of light. Further, the total reflection preventing portion 335 of the present embodiment includes a plurality of microspheres. The quantum dot filter part 330 according to the $11^{th}$ embodiment, as observed from FIG. 9A and FIG. 14C, has the configuration and structure similar or equal to those of the quantum dot filter part 330 according to the $3^{rd}$ embodiment. In order to avoid the redundant description, the same technical features and operating principles as the quantum dot filter part 330 of the $3^{rd}$ embodiment shall be omitted in the following description.

Preferably, a diameter of each of the microspheres is set to 200 nm~2 μm. Preferably, each of the microspheres may be made of one of silicon dioxide (silica), polystyrene, PET (polyethylene-terephthalate), PDMS (polydimethylsiloxane) and silicone. As an embodiment additional to the $11^{th}$ embodiment, the light entrance plane 330a and/or the light exit plane 330b of the quantum dot filter part 330 may further include an insulating film, which is similar to the configuration shown in FIG. 9B. Further, the insulating film may include a plurality of microspheres to prevent light from being reflected by the light entrance plane 330a and/or the light exit plane 330b. Hence, it may be able to extend durability of quantum dots (QD) included in the quantum dot filter part 330.

Referring to FIG. 14C, a moving path of light by the quantum dot filter part 330 according to the $11^{th}$ embodiment in the display unit according to the $3^{rd}$ embodiment is described as follows. First of all, light having a strong straightforwardness is emitted from a plurality of the light source parts 236 and is then incident on the light entrance plane 330a of the light guide plate 231. The light (i.e., a point light source) incident on the light entrance plane 330a of the light guide plate 231 is scattered within the light guide plate 231 and is then discharged as a scattered light via the light exit plane 330b of the light guide plate 231 by being transformed into a surface light source.

Most of the light discharged as the scattered light from the light guide plate 231 by being transformed into the surface light source then enters the quantum dot filter part 330 by the total reflection preventing portion 335 including a plurality of the microspheres formed on the light entrance plane 330a (or the insulating film provided to the light entrance plane 330a) of the quantum dot filter part 330. The light having entered the quantum dot filter part 330 is wavelength-transformed by the quantum dots (QD). Thereafter, most of the wavelength-transformed light is discharged from the quantum dot filter part 330 by the total reflection preventing portion 335 including a plurality of the microspheres formed on the light exit plane 330b (or the insulating film provided to the light entrance plane 330a) of the quantum dot filter part 330 and is then incident on the diffuser sheet or the display panel 210.

Thus, as the quantum dot filter part 330 is provided with the total reflection preventing portion 335 and is also arranged over the light guide plate 231, most of the scattered light by the light guide plate 231 is incident on the light entrance plane 330a of the quantum dot filter part 330 at an angle smaller than the total reflection threshold angle and a plurality of the microspheres of the total reflection preventing portion 335 also prevent the total reflection of the light one more time. Therefore, it may be able to eliminate the total reflection of the light almost completely from the light entrance plane 330a and the light exit plane 330b of the quantum dot filter part 330.

Figure 14D:
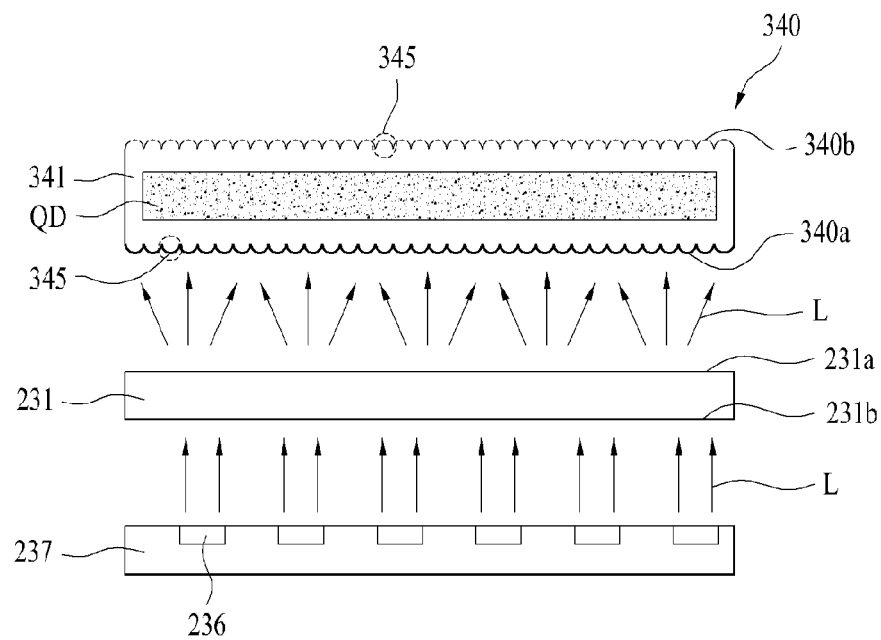
FIG. 14D is a schematic layout of a quantum dot filter part according to a 12th embodiment of the present invention.

FIG. 14D is a schematic layout of a quantum dot filter part 340 according to a $12^{th}$ embodiment of the present invention. Referring to FIG. 14D, the quantum dot filter part 340 includes a total reflection preventing portion 345 provided to a light entrance plane 340a and/or a light exit plane 340b of the quantum dot filter part 340 to prevent a total reflection of light. Further, the total reflection preventing portion 345 of the present embodiment includes a plurality of microlenses each of which at least one of a horizontal cross-section and a vertical cross-section has an arc shape. The quantum dot filter part 340 according to the $8^{th}$ embodiment, as observed from FIG. 10A and FIG. 14D, has the configuration and structure similar or equal to those of the quantum dot filter part 340 according to the $4^{th}$ embodiment. In order to avoid the redundant description, the same technical features and operating principles as the quantum dot filter part 340 of the $4^{th}$ embodiment shall be omitted in the following description.

Preferably, a radius of a cross-section of the microlens may range 1 μm to 100 μm. Preferably, each of the microlenses may have a semi-cylinder shape or a hemisphere shape. Preferably, each of the microlenses may be made of such material as silicon dioxide (silica), polystyrene, PET (polyethylene-terephthalate), PDMS (polydimethylsiloxane) and silicone.

As an embodiment additional to the $12^{th}$ embodiment, the light entrance plane 340a and/or the light exit plane 340b of the quantum dot filter part 340 may further include an insulating film, which is similar to the configuration shown in FIG. 10B. Further, the insulating film may include a plurality of microlenses each of which at least one of a horizontal cross-section and a vertical cross-section has an arc shape to prevent light from being reflected by the light entrance plane 340a and/or the light exit plane 340b. Hence, it may be able to extend durability of quantum dots (QD) included in the quantum dot filter part 340.

Referring to FIG. 14D, a moving path of light by the quantum dot filter part 340 according to the $12^{th}$ embodiment in the display unit according to the $3^{rd}$ embodiment is described as follows. First of all, light having a strong straightforwardness is emitted from a plurality of the light source parts 236 and is then incident on the light entrance plane 340a of the light guide plate 231. The light (i.e., a point light source) incident on the light entrance plane 340a of the light guide plate 231 is scattered within the light guide plate 231 and is then discharged as a scattered light via the light exit plane 340b of the light guide plate 231 by being transformed into a surface light source.

Most of the light discharged as the scattered light from the light guide plate 231 by being transformed into the surface light source then enters the quantum dot filter part 340 by the total reflection preventing portion 345 including a plurality of the microlenses formed on the light entrance plane 340a (or the insulating film provided to the light entrance plane 340a) of the quantum dot filter part 340. The light having entered the quantum dot filter part 340 is wavelength-transformed by the quantum dots (QD). Thereafter, most of the wavelength-transformed light is discharged from the quantum dot filter part 340 by the total reflection preventing portion 345 including a plurality of the microlenses formed on the light exit plane 340b (or the insulating film provided to the light entrance plane 340a) of the quantum dot filter part 340 and is then incident on the diffuser sheet or the display panel 210.

Thus, as the quantum dot filter part 340 is provided with the total reflection preventing portion 345 and is also arranged over the light guide plate 231, most of the scattered light by the light guide plate 231 is incident on the light entrance plane 340a of the quantum dot filter part 340 at an angle smaller than the total reflection threshold angle and a plurality of the microlenses of the total reflection preventing portion 345 also prevent the total reflection of the light one more time. Therefore, it may be able to eliminate the total reflection of the light almost completely from the light entrance plane 340a and the light exit plane 340b of the quantum dot filter part 340.

Preferably, each of the total reflection preventing portions of the 9th to 12th embodiments of the present invention may be formed in one body of both of the light entrance plane and the light exit plane of the quantum dot filter part or may be formed on the insulating film provided to both of the light entrance plane and the light exit plane of the quantum dot filter part. In particular, the total reflection preventing portion may include the preset surface roughness within the range of preventing light from being totally reflected by the light entrance plane and the light exit plane, a plurality of the prism shape patterns each of which at least one of a horizontal cross-section and a vertical cross-section has a prism shape, a plurality of the microspheres, or a plurality of the convex microlenses each of which at least one of a horizontal cross-section and a vertical cross-section has an arc shape.

In particular, various combinations of the total reflection preventing portions according to the 9th to 12th embodiments may be applied to each of the light entrance plane and the light exit plane. For instance, the total reflection preventing portion according to the 9th embodiment (i.e., the total reflection preventing portion having the preset surface roughness) is provided to the light entrance plane of the quantum dot filter part and the total reflection preventing portion according to the 12th embodiment (i.e., the total reflection preventing portion including a plurality of the microlenses) may be provided to the light exit plane of the quantum dot filter part.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute various embodiments of the present invention.

Accordingly, the present invention provides the following effects and/or advantages.

First of all, compared to AMOLED, a color gamut of a display can be enhanced with a low production cost. Secondly, a color gamut of a display can be enhanced with a configuration of a related art LCD display. Thirdly, a color variation of a display unit can be eliminated to prevent attenuation of a color gamut.

Fourthly, a radiation intensity loss of light, which is emitted from a light source part and totally reflected by a light entrance plane of a quantum dot preventing portion, can be prevented. Fifthly, a radiation intensity loss of light, which is totally reflected into a quantum dot filter part by a light exit plane of the quantum dot filter part, can be prevented. Finally, the present invention prevents quantum dots included in a quantum dot filter part from being degraded by the heat generated from a light source part, thereby extending durability of the quantum dot filter part.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display panel configured to display information;
   a plurality of light source parts spaced apart from each other and configured to output light;
   a light guide plate provided under the display panel and configured to guide the light output by the light source parts to the display panel; and
   a quantum dot filter part including a light entrance plane to which light is input and a light exit plane from which the light is wavelength-transformed and discharged,
   wherein at least one of the light entrance plane and the light exit plane of the quantum dot filter part includes a surface having a predetermined shape characteristic configured to increase an amount of the light input on and passed through the light entrance plane and to increase an amount of the light discharged from the light exit plane.

2. The mobile terminal of claim 1, wherein the quantum dot filter part comprises a light-transmittive pipe member and quantum dots filling the light-transmittive pipe member, and
   wherein one side of the light-transmittive pipe member is the light entrance plane and the other side of the light-transmittive pipe member is the light exit plane.

3. The mobile terminal of claim 2, wherein the quantum dot filter part further comprises an insulating film on at least one of the light entrance plane and the light exit plane.

4. The mobile terminal of claim 3, wherein the insulating film comprises polystyrene.

5. The mobile terminal of claim 1, wherein the light source parts are disposed next to a lateral side of the light guide plate, and
   wherein the quantum dot filter part is provided between the light source parts and the light guide plate or between the display panel and the light guide plate.

6. The mobile terminal of claim 1, wherein the light source parts are disposed under the light guide plate, and
   wherein the quantum dot filter part is disposed between the light source parts and the light guide plate or between the display panel and the light guide plate.

7. The mobile terminal of claim 1, wherein the predetermined shape characteristic comprises a preset surface roughness in a range of 1 μm to 100 μm.

8. The mobile terminal of claim 1, wherein the predetermined shape characteristic comprises a plurality of prism shape patterns.

9. The mobile terminal of claim 8, wherein a unit pattern of the prism shape patterns comprises one of a trigonal prism shape and a trigonal pyramid shape.

10. The mobile terminal of claim 8, wherein a pitch of a cross-section of a corresponding prism shape pattern is in a range of 10 μm to 100 μm.

11. The mobile terminal of claim 8, wherein a prism angle of a corresponding prism shape pattern is in a range of 70 degrees to 110 degrees.

12. The mobile terminal of claim 1, wherein the predetermined shape characteristic comprises a plurality of microspheres.

13. The mobile terminal of claim 12, wherein a diameter of a corresponding microsphere is in a range of 200 nm to 2 μm.

14. The mobile terminal of claim 12, wherein the microspheres comprise one of silicon dioxide (silica) and polystyrene.

15. The mobile terminal of claim 1, wherein the predetermined shape characteristic comprises a plurality of microlenses, each of which includes at least one of a horizontal cross-section and a vertical cross-section having an arc shape.

16. The mobile terminal of claim 15, wherein a radius of a cross-section of a corresponding microlens is in a range of 1 μm to 100 μm.

17. The mobile terminal of claim 15, wherein a corresponding microlens has one of a semi-cylinder shape and a hemisphere shape.

18. The mobile terminal of claim 15, wherein the microlenses comprise one of PET (polyethylene-terephthalate), PDMS (polydimethylsiloxane) and silicone.

19. The mobile terminal of claim 1, wherein each of a plurality of the light source parts comprises one of a blue LED and a UV LED.

* * * * *